US012627358B2

(12) United States Patent
Hirzallah et al.

(10) Patent No.: US 12,627,358 B2
(45) Date of Patent: May 12, 2026

(54) SUBBAND-BASED REPORTING FOR CONCURRENT BEAM PAIR LINKS

(71) Applicant: QUALCOMM INCORPORATED, San Diego, CA (US)

(72) Inventors: Mohammed Ali Mohammed Hirzallah, San Marcos, CA (US); Arumugam Chendamarai Kannan, San Diego, CA (US); Srinivas Yerramalli, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 18/557,546

(22) PCT Filed: Jun. 13, 2022

(86) PCT No.: PCT/US2022/072903
§ 371 (c)(1),
(2) Date: Oct. 26, 2023

(87) PCT Pub. No.: WO2022/266602
PCT Pub. Date: Dec. 22, 2022

(65) Prior Publication Data
US 2024/0214052 A1     Jun. 27, 2024

(30) Foreign Application Priority Data

Jun. 15, 2021     (IN) .............................. 202141026583

(51) Int. Cl.
*H04B 7/06* (2006.01)
*H04W 24/10* (2009.01)

(52) U.S. Cl.
CPC .......... *H04B 7/0696* (2023.05); *H04W 24/10* (2013.01)

(58) Field of Classification Search
CPC .... H04B 7/0695; H04B 7/0696; H04B 7/088; H04B 7/2631; H04W 24/10
See application file for complete search history.

(56) References Cited

U.S. PATENT DOCUMENTS 10,425,144 B2     9/2019 Raghavan et al.
2018/0202826 A1*     7/2018 Takeuchi ............... G09B 29/10
(Continued)

FOREIGN PATENT DOCUMENTS

WO     WO-2020034312 A1     2/2020

OTHER PUBLICATIONS

International Search Report and Written Opinion—PCT/US2022/072903—ISA/EPO—Sep. 19, 2022.

*Primary Examiner* — Benjamin H Elliott, IV
(74) *Attorney, Agent, or Firm* — Holland & Hart LLPQualcomm Incorporated

(57) ABSTRACT

Methods, systems, and devices for wireless communication are described to support concurrent beam pair link (BPL) measurement and reporting on a subband basis. A base station may configure a user equipment (UE) to measure one or more wideband reference signals transmitted by the base station for each of a set of BPLs, for joint BPL selection, and the UE may receive the wideband reference signals. The UE may perform measurements for each of the set BPLs at a subband level and may report signal qualities for the different BPL combinations at a subband level. For example, the UE may measure different combinations of transmit beams and receive beams (e.g., may measure different BPLs) over multiple antenna panels, on a per-subband basis. The UE may report information based on the measurements that may support selection of BPLs for multi-panel and multi-beam operation for one or more subbands.

30 Claims, 17 Drawing Sheets

(56)     References Cited

U.S. PATENT DOCUMENTS

| | | | | |
|---|---|---|---|---|
| 2019/0149306 A1* | 5/2019 | Gao | ..................... | H04B 17/309 |
| | | | | 370/252 |
| 2019/0230706 A1* | 7/2019 | Li | ....................... | H04W 72/046 |
| 2020/0067590 A1* | 2/2020 | Wang | ................... | H04B 7/0632 |
| 2020/0136705 A1* | 4/2020 | Li | ....................... | H04B 7/0408 |
| 2020/0205145 A1* | 6/2020 | John Wilson | ......... | H04W 76/19 |
| 2020/0221325 A1* | 7/2020 | Zheng | ................... | H04W 28/00 |
| 2020/0259608 A1* | 8/2020 | Kakishima | ............ | H04W 24/10 |
| 2021/0021314 A1* | 1/2021 | Sun | ...................... | H04B 7/0626 |
| 2021/0028843 A1* | 1/2021 | Zhou | ..................... | H04B 7/063 |
| 2021/0211176 A1* | 7/2021 | Gao | ...................... | H04W 24/10 |
| 2022/0200682 A1* | 6/2022 | Hirzallah | ........... | H04B 7/06952 |
| 2022/0272680 A1* | 8/2022 | Landis | ................. | H04W 72/02 |
| 2022/0394745 A1* | 12/2022 | Schober | ................ | H04W 16/14 |
| 2023/0057994 A1* | 2/2023 | Elkotby | ............. | H04B 7/06952 |
| 2024/0214052 A1* | 6/2024 | Hirzallah | ............. | H04B 7/0695 |

* cited by examiner

610

620

615

605

600

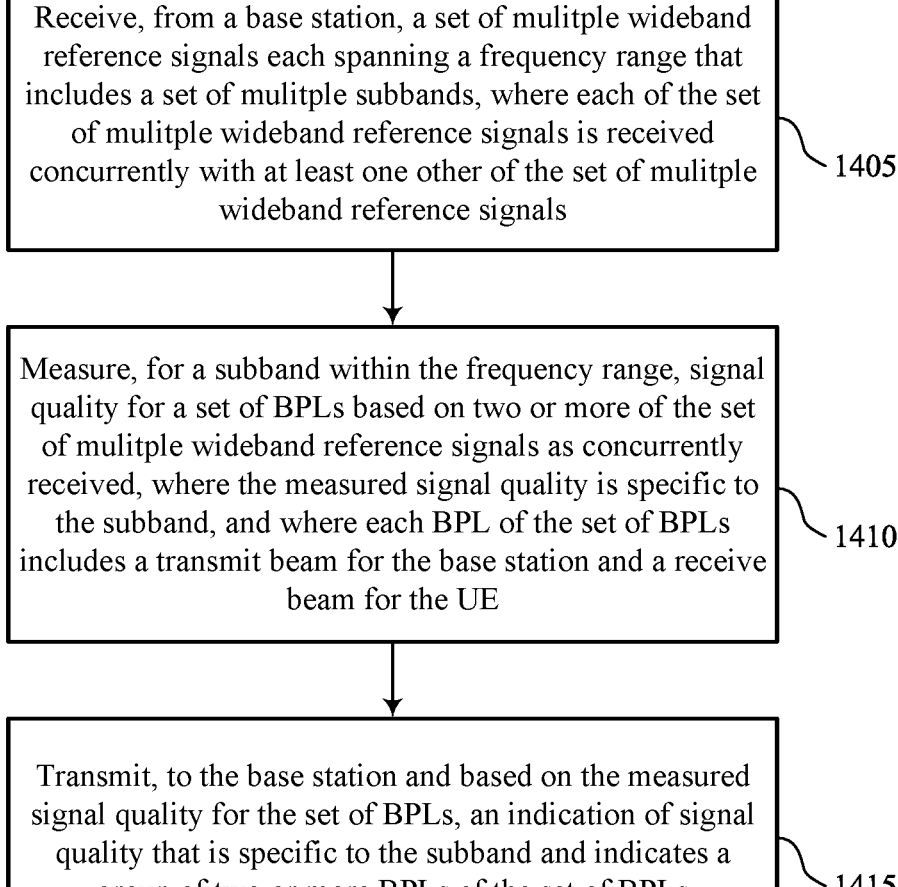

Receive, from a base station, a set of mulitple wideband reference signals each spanning a frequency range that includes a set of mulitple subbands, where each of the set of mulitple wideband reference signals is received concurrently with at least one other of the set of mulitple wideband reference signals

1405

Measure, for a subband within the frequency range, signal quality for a set of BPLs based on two or more of the set of mulitple wideband reference signals as concurrently received, where the measured signal quality is specific to the subband, and where each BPL of the set of BPLs includes a transmit beam for the base station and a receive beam for the UE

1410

Transmit, to the base station and based on the measured signal quality for the set of BPLs, an indication of signal quality that is specific to the subband and indicates a group of two or more BPLs of the set of BPLs

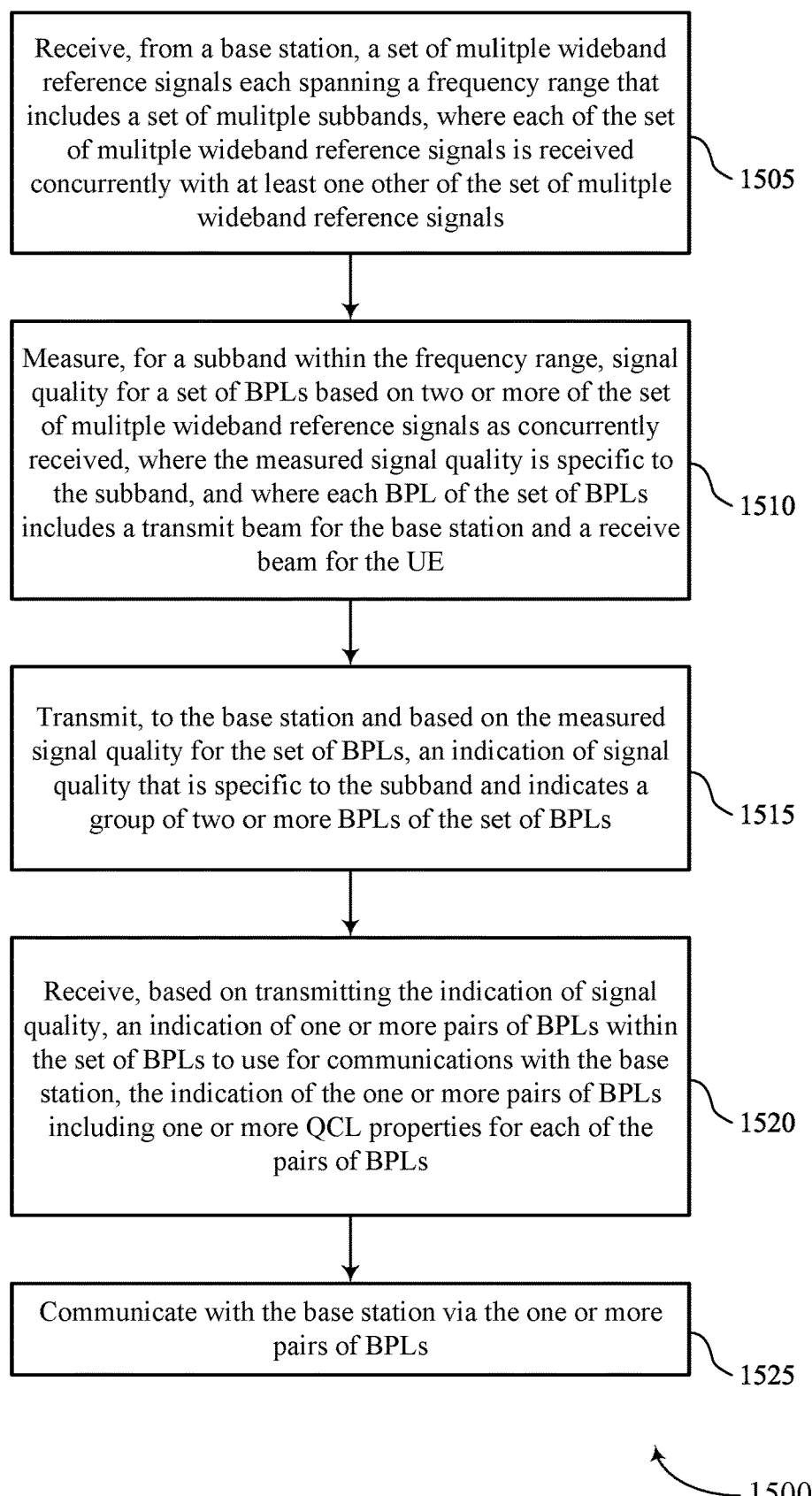

Receive, from a base station, a set of mulitple wideband reference signals each spanning a frequency range that includes a set of mulitple subbands, where each of the set of mulitple wideband reference signals is received concurrently with at least one other of the set of mulitple wideband reference signals                                                  ⌐1505

Measure, for a subband within the frequency range, signal quality for a set of BPLs based on two or more of the set of mulitple wideband reference signals as concurrently received, where the measured signal quality is specific to the subband, and where each BPL of the set of BPLs includes a transmit beam for the base station and a receive beam for the UE                                                  ⌐1510

Transmit, to the base station and based on the measured signal quality for the set of BPLs, an indication of signal quality that is specific to the subband and indicates a group of two or more BPLs of the set of BPLs                                                  ⌐1515

Receive, based on transmitting the indication of signal quality, an indication of one or more pairs of BPLs within the set of BPLs to use for communications with the base station, the indication of the one or more pairs of BPLs including one or more QCL properties for each of the pairs of BPLs                                                  ⌐1520

Communicate with the base station via the one or more pairs of BPLs                                                  ⌐1525

Figure 16:
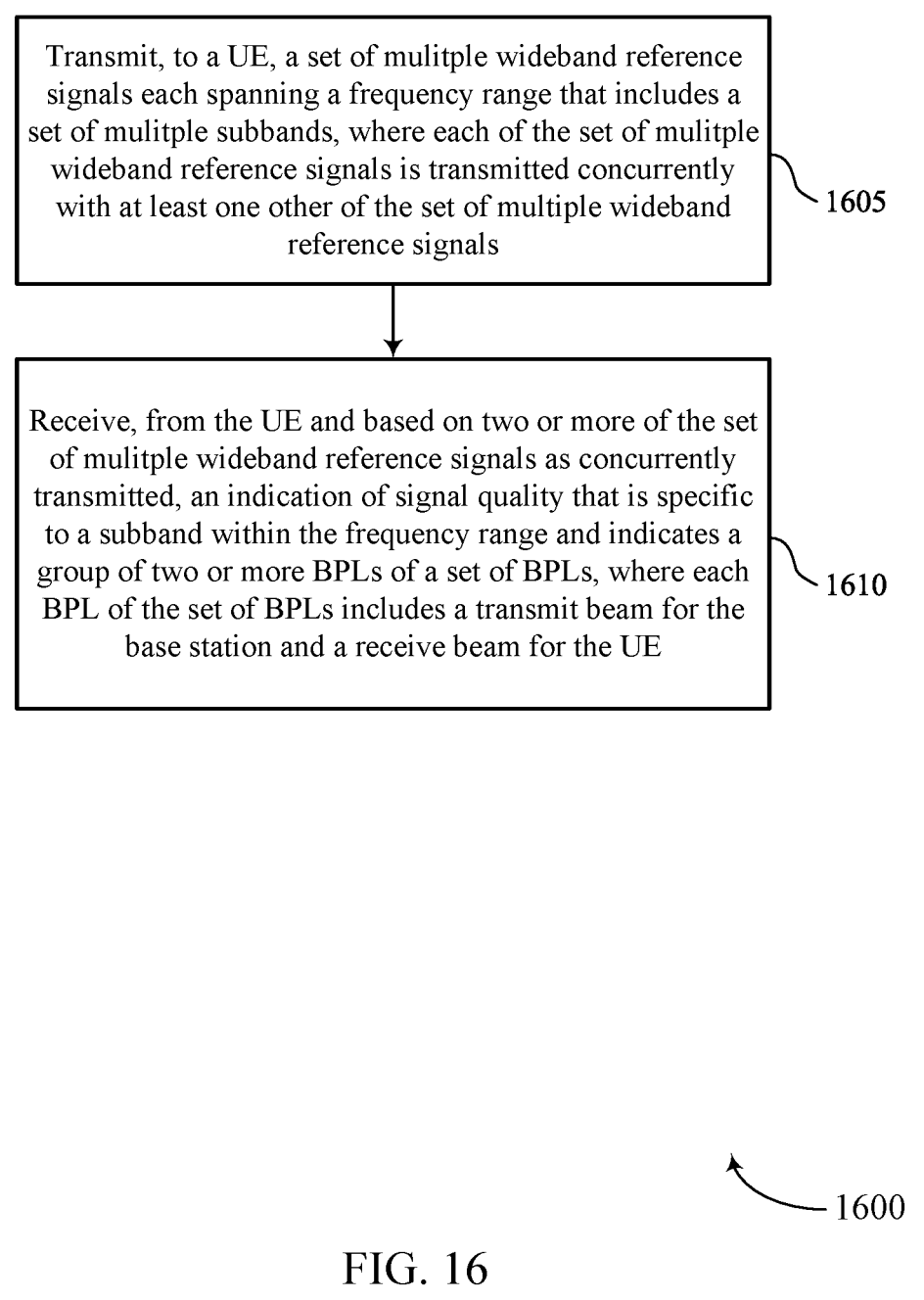

Transmit, to a UE, a set of mulitple wideband reference signals each spanning a frequency range that includes a set of mulitple subbands, where each of the set of mulitple wideband reference signals is transmitted concurrently with at least one other of the set of multiple wideband reference signals

1605

Receive, from the UE and based on two or more of the set of mulitple wideband reference signals as concurrently transmitted, an indication of signal quality that is specific to a subband within the frequency range and indicates a group of two or more BPLs of a set of BPLs, where each BPL of the set of BPLs includes a transmit beam for the base station and a receive beam for the UE

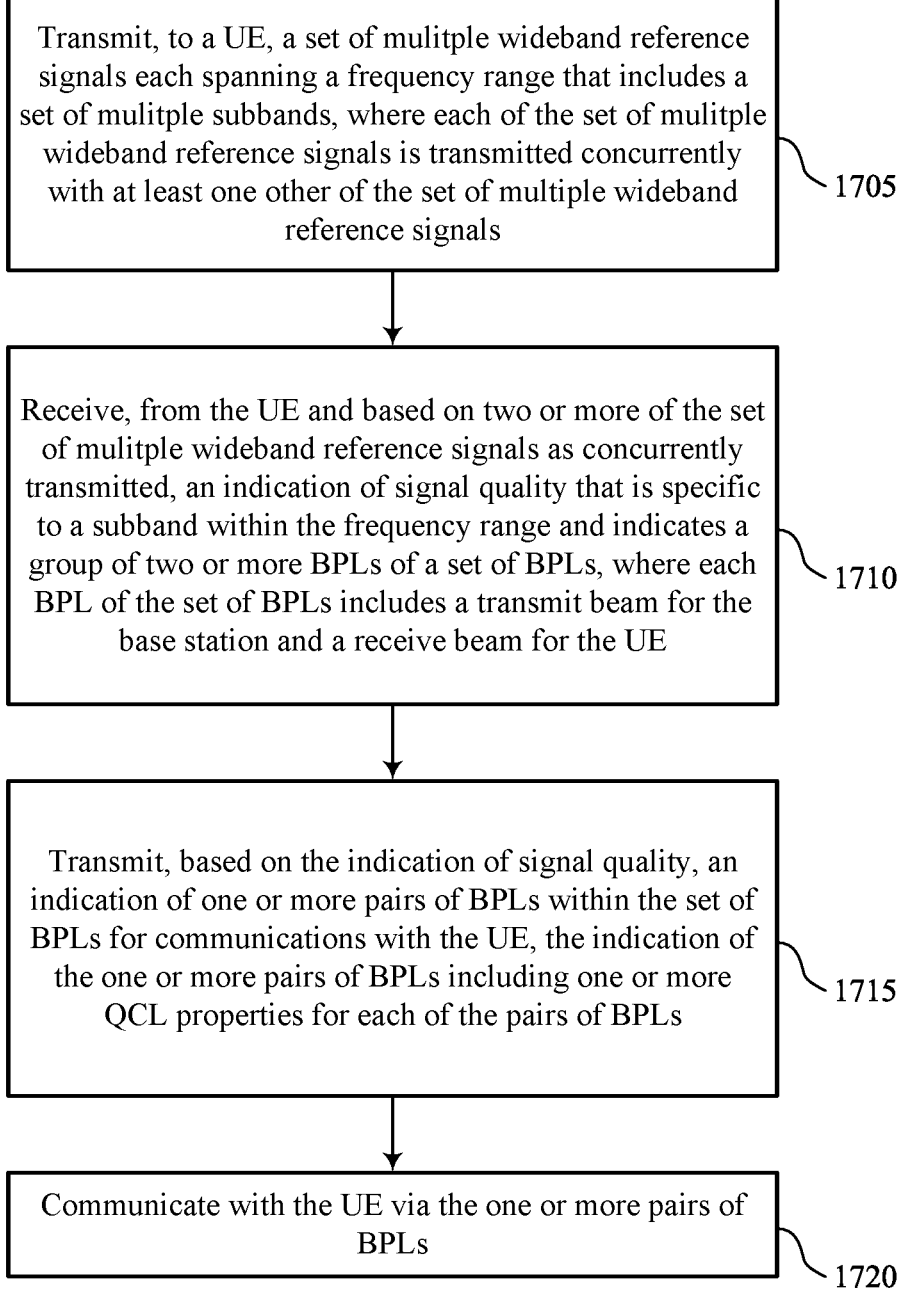

Transmit, to a UE, a set of mulitple wideband reference signals each spanning a frequency range that includes a set of mulitple subbands, where each of the set of mulitple wideband reference signals is transmitted concurrently with at least one other of the set of multiple wideband reference signals
1705

Receive, from the UE and based on two or more of the set of mulitple wideband reference signals as concurrently transmitted, an indication of signal quality that is specific to a subband within the frequency range and indicates a group of two or more BPLs of a set of BPLs, where each BPL of the set of BPLs includes a transmit beam for the base station and a receive beam for the UE
1710

Transmit, based on the indication of signal quality, an indication of one or more pairs of BPLs within the set of BPLs for communications with the UE, the indication of the one or more pairs of BPLs including one or more QCL properties for each of the pairs of BPLs
1715

Communicate with the UE via the one or more pairs of BPLs
1720

SUBBAND-BASED REPORTING FOR CONCURRENT BEAM PAIR LINKS

CROSS REFERENCES

The present Application is a 371 national stage filing of International PCT Application No. PCT/US2022/072903 by Hirzallah et al. entitled "SUBBAND-BASED REPORTING FOR CONCURRENT BEAM PAIR LINKS," filed Jun. 13, 2022; and claims priority to Indian Patent Application No. 202141026583 by Hirzallah et al. entitled "SUBBAND-BASED REPORTING FOR CONCURRENT BEAM PAIR LINKS," filed Jun. 15, 2021, each of which is assigned to the assignee hereof, and each of which is expressly incorporated by reference in its entirety herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE and a base station may communicate using one or more beams, or beam pair links (BPLs), where each BPL may include a receive beam and a transmit beam.

SUMMARY

The described techniques relate to improved methods, systems, devices, and apparatuses that support subband-based reporting for concurrent beam pair links (BPLs). Generally, the described techniques provide for concurrent BPL measurement and reporting to be performed on a subband basis. For example, a user equipment (UE) may determine (e.g., based on one or more measurements) and report information to a base station that may support selection of two or more BPLs per subband, such as BPLs having a highest signal quality for that subband. The base station may configure the UE to measure one or more wideband reference signals transmitted by the base station for each of a set of BPLs, for joint BPL selection, and the UE may receive the wideband reference signals. The UE may perform measurements for each of the set BPLs at a subband level and may report signal qualities for the different BPL combinations at a subband level. For example, the UE may measure different combinations of transmit beams and receive beams (e.g., may measure different BPLs) over multiple antenna panels, on a subband basis. The UE may report information based on the measurements that may support selection of BPLs for multi-panel and multi-beam operation for one or more subbands.

A method for wireless communication at a UE is described. The method may include receiving, from a base station, a set of multiple wideband reference signals each spanning a frequency range that includes a set of multiple subbands, where each of the set of multiple wideband reference signals is received concurrently with at least one other of the set of multiple wideband reference signals, measuring, for a subband within the frequency range, signal quality for a set of BPLs based on two or more of the set of multiple wideband reference signals as concurrently received, wherein the measured signal quality is specific to the subband, and wherein each BPL of the set of BPLs includes a transmit beam for the base station and a receive beam for the UE, and transmitting, to the base station and based on the measured signal quality that is specific to the set of BPLs, an indication of signal quality for the subband and indicates a group of two or more BPLs of the set of BPLs.

An apparatus for wireless communication at a UE is described. The apparatus may include a processor, memory coupled with the processor, and instructions stored in the memory. The instructions may be executable by the processor to cause the apparatus to receive, from a base station, a set of multiple wideband reference signals each spanning a frequency range that includes a set of multiple subbands, where each of the set of multiple wideband reference signals is received concurrently with at least one other of the set of multiple wideband reference signals, measuring, for a subband within the frequency range, signal quality for a set of BPLs based on two or more of the set of multiple wideband reference signals as concurrently received, wherein the measured signal quality is specific to the subband, and wherein each BPL of the set of BPLs includes a transmit beam for the base station and a receive beam for the UE, and transmit, to the base station and based on the measured signal quality for the set of BPLs, an indication of signal quality that is specific to the subband and indicates a group of two or more BPLs of the set of BPLs.

Another apparatus for wireless communication at a UE is described. The apparatus may include means for receiving, from a base station, a set of multiple wideband reference signals each spanning a frequency range that includes a set of multiple subbands, where each of the set of multiple wideband reference signals is received concurrently with at least one other of the set of multiple wideband reference signals, means for measuring, for a subband within the frequency range, signal quality for a set of BPLs based on two or more of the set of multiple wideband reference signals as concurrently received, wherein the measured signal quality is specific to the subband, and wherein each BPL of the set of BPLs includes a transmit beam for the base station and a receive beam for the UE, and means for transmitting, to the base station and based on the measured signal quality for the set of BPLs, an indication of signal quality that is specific to the subband and indicates a group of two or more BPLs of the set of BPLs.

A non-transitory computer-readable medium storing code for wireless communication at a UE is described. The code may include instructions executable by a processor to receive, from a base station, a set of multiple wideband reference signals each spanning a frequency range that includes a set of multiple subbands, where each of the set of multiple wideband reference signals is received concurrently with at least one other of the set of multiple wideband reference signals, measuring, for a subband within the frequency range, signal quality for a set of BPLs based on two or more of the set of multiple wideband reference signals as concurrently received, wherein the measured signal quality is specific to the subband, and wherein each BPL of the set of BPLs including a transmit beam for the base station and a receive beam for the UE, and transmit, to the base station and based on the measured signal quality for the set of BPLs, an indication of signal quality that is specific to the subband and indicates a group of two or more BPLs of the set of BPLs.

Some examples of the method, apparatuses, and non-transitory computer-readable medium described herein may further include operations, features, means, or instructions for receiving an indication to report signal quality on a per-subband basis for the set of BPLs, where transmitting the indication of signal quality that is specific to the subband may be based on receiving the indication to report signal quality on the per-subband basis.

In some examples of the method, apparatuses, and non-transitory computer-readable medium described herein, operations, features, means, or instructions for receiving the indication to report signal quality on the per-subband basis may include operations, features, means, or instructions for receiving an indication of a quantity of BPLs to indicate via the indication of signal quality that is specific to the subband, where each of the BPLs indicated by the indication of signal quality may have higher signal quality than each of the other BPLs of the set of BPLs.

In some examples of the method, apparatuses, and non-transitory computer-readable medium described herein, operations, features, means, or instructions for receiving the indication to report signal quality on the per-subband basis may include operations, features, means, or instructions for receiving an indication of a periodicity associated with transmitting the indication of signal quality, a periodicity associated with measuring signal quality for the set of BPLs, or both.

Some examples of the method, apparatuses, and non-transitory computer-readable medium described herein may further include operations, features, means, or instructions for receiving an indication of one or more subbands within the first frequency range for reporting signal quality, where measuring the signal quantity and transmitting the indication of signal quality that is specific to the subband may be based on the subband being included in the indicated one or more subbands.

Some examples of the method, apparatuses, and non-transitory computer-readable medium described herein may further include operations, features, means, or instructions for determining one or more subbands within the frequency range for reporting signal quality, where measuring the signal quantity and transmitting the indication of signal quality that is specific to the subband may be based on the subband being included in the determined one or more subbands.

Some examples of the method, apparatuses, and non-transitory computer-readable medium described herein may further include operations, features, means, or instructions for measuring, for a second subband within the frequency range, signal quality for the set of BPLs based on two or more of the set of multiple wideband reference signals as concurrently received, wherein the second signal quality is specific to the second subband, and transmitting, to the base station and based on the measuring of the second signal quality for the set of BPLs, an indication of signal quality that is specific to the second subband and indicates a second group of two or more BPLs of the set of BPLs.

In some examples of the method, apparatuses, and non-transitory computer-readable medium described herein, operations, features, means, or instructions for transmitting the indication of signal quality may include operations, features, means, or instructions for transmitting an indication of a set of candidate subbands within the frequency range for communications with the base station, the set of candidate subbands including the subband and transmitting, for each subband of the set of candidate subbands, an indication of a respective group of two or more candidate BPLs for communications with the base station via the subband.

In some examples of the method, apparatuses, and non-transitory computer-readable medium described herein, operations, features, means, or instructions for transmitting the indication of signal quality may include operations, features, means, or instructions for transmitting an indication of a set of candidate BPLs for communications with the base station, the set of candidate BPLs including the group of two or more BPLs and transmitting, for each candidate BPL of the set of candidate BPLs, an indication of a respective set of one or more candidate subbands for communications with the base station via the candidate BPL.

In some examples of the method, apparatuses, and non-transitory computer-readable medium described herein, operations, features, means, or instructions for transmitting the indication of signal quality may include operations, features, means, or instructions for transmitting a respective indication of one or more signal quality measurements for each of a set of multiple BPLs, where each indication of one or more signal quality measurements may be associated with a respective combination of a BPL within the set of BPLs and a respective subband within the first frequency range.

In some examples of the method, apparatuses, and non-transitory computer-readable medium described herein, the indication of signal quality includes a first signal quality measurement and one or more other signal quality measurements each indicating a respective difference relative to the first signal quality measurement.

Some examples of the method, apparatuses, and non-transitory computer-readable medium described herein may further include operations, features, means, or instructions for receiving, based on transmitting the indication of signal quality, an indication of one or more pairs of BPLs within the set of BPLs to use for communications with the base station, the indication of the one or more pairs of BPLs including one or more quasi co-location (QCL) properties for each of the pairs of BPLs, and communicating with the base station via the one or more pairs of BPLs.

Some examples of the method, apparatuses, and non-transitory computer-readable medium described herein may further include operations, features, means, or instructions for receiving an indication of a repetition of the set of multiple wideband reference signals and measuring, for a second subband within the frequency range at a second time based on the repetition, a second signal quality for the set of BPLs based on two or more of the set of multiple wideband reference signals as concurrently received, where the measuring of the signal quality that is specific to the subband occurs at a first time.

Some examples of the method, apparatuses, and non-transitory computer-readable medium described herein may further include operations, features, means, or instructions for receiving an indication of a repetition of the set of multiple wideband reference signals and measuring, at a second time based on the repetition, a second signal quality for a second set of BPLs that is specific to the subband and based on two or more of the set of multiple wideband reference signals as concurrently received, where the measuring of the signal quality that is specific to the set of BPLs occurs at a first time.

Some examples of the method, apparatuses, and non-transitory computer-readable medium described herein may further include operations, features, means, or instructions for transmitting an indication of a multi-panel capability of the UE, a multi-beam capability of the UE, or both, where receiving the set of multiple reference signals may be based on transmitting the indication.

A method for wireless communication at a base station is described. The method may include transmitting, to a UE, a set of multiple wideband reference signals each spanning a frequency range that includes a set of multiple subbands, where each of the set of multiple wideband reference signals is transmitted concurrently with at least one other of the set of multiple wideband reference signals and receiving, from the UE and based on two or more of the set of multiple wideband reference signals as concurrently transmitted, an indication of signal quality that is specific to a subband within the frequency range and indicates a group of two or more BPLs of a set of BPLs, where each BPL of the set of BPLs includes a transmit beam for the base station and a receive beam for the UE.

An apparatus for wireless communication at a base station is described. The apparatus may include a processor, memory coupled with the processor, and instructions stored in the memory. The instructions may be executable by the processor to cause the apparatus to transmit, to a UE, a set of multiple wideband reference signals each spanning a frequency range that includes a set of multiple subbands, where each of the set of multiple wideband reference signals is transmitted concurrently with at least one other of the set of multiple wideband reference signals and receive, from the UE and based on two or more of the set of multiple wideband reference signals as concurrently transmitted, an indication of signal quality that is specific to a subband within the frequency range and indicates a group of two or more BPLs of a set of BPLs, where each BPL of the set of BPLs includes a transmit beam for the base station and a receive beam for the UE.

Another apparatus for wireless communication at a base station is described. The apparatus may include means for transmitting, to a UE, a set of multiple wideband reference signals each spanning a frequency range that includes a set of multiple subbands, where each of the set of multiple wideband reference signals is transmitted concurrently with at least one other of the set of multiple wideband reference signals and means for receiving, from the UE and based on two or more of the set of multiple wideband reference signals as concurrently transmitted, an indication of signal quality that is specific to a subband within the frequency range and indicates a group of two or more BPLs of a set of BPLs, where each BPL of the set of BPLs includes a transmit beam for the base station and a receive beam for the UE.

A non-transitory computer-readable medium storing code for wireless communication at a base station is described. The code may include instructions executable by a processor to transmit, to a UE, a set of multiple wideband reference signals each spanning a frequency range that includes a set of multiple subbands, where each of the set of multiple wideband reference signals is transmitted concurrently with at least one other of the set of multiple wideband reference signals and receive, from the UE and based on two or more of the set of multiple wideband reference signals as concurrently transmitted, an indication of signal quality that is specific to a subband within the first frequency range and indicates a group of two or more BPLs of a set of BPLs, where each BPL of the set of BPLs includes a transmit beam for the base station and a receive beam for the UE.

Some examples of the method, apparatuses, and non-transitory computer-readable medium described herein may further include operations, features, means, or instructions for transmitting, to the UE, an indication to report signal quality on a per-subband basis for the set of BPLs, where receiving the indication of signal quality that is specific to the subband may be based on transmitting the indication to report signal quality on the per-subband basis.

In some examples of the method, apparatuses, and non-transitory computer-readable medium described herein, operations, features, means, or instructions for transmitting the indication to report signal quality on the per-subband basis may include operations, features, means, or instructions for transmitting an indication of a quantity of BPLs for the UE to indicate via the indication of signal quality that is specific to the subband, where each of the BPLs indicated by the indication of signal quality may have higher signal quality than each of the other BPLs of the set of BPLs.

In some examples of the method, apparatuses, and non-transitory computer-readable medium described herein, operations, features, means, or instructions for transmitting the indication to report signal quality on the per-subband basis may include operations, features, means, or instructions for transmitting an indication of a periodicity associated with the UE transmitting the indication of signal quality, a periodicity associated with the UE measuring signal quality for the set of BPLs, or both.

Some examples of the method, apparatuses, and non-transitory computer-readable medium described herein may further include operations, features, means, or instructions for transmitting an indication of one or more subbands within the frequency range for signal quality reporting by the UE, where receiving the indication of signal quality that is specific to the subband may be based on the subband being included in the indicated one or more subbands.

Some examples of the method, apparatuses, and non-transitory computer-readable medium described herein may further include operations, features, means, or instructions for transmitting an indication of an allocation of one or more subbands of the frequency range for communications between the UE and the base station, where receiving the indication of signal quality that is specific to the subband may be based on the subband being included in the allocated one or more subbands.

Some examples of the method, apparatuses, and non-transitory computer-readable medium described herein may further include operations, features, means, or instructions for receiving, from the UE and based on two or more of the set of multiple wideband reference signals as concurrently transmitted, a second indication of signal quality that is specific to a second subband within the frequency range and indicates a second group of two or more BPLs of the set of BPLs.

In some examples of the method, apparatuses, and non-transitory computer-readable medium described herein, operations, features, means, or instructions for receiving the indication of signal quality may include operations, features, means, or instructions for receiving an indication of a set of candidate subbands within the frequency range for communications with the UE, the set of candidate subbands including the subband, and receiving, for each subband of the set of candidate subbands, an indication of a respective group of two or more candidate BPLs for communications with the UE via the subband.

In some examples of the method, apparatuses, and non-transitory computer-readable medium described herein, operations, features, means, or instructions for receiving the indication of signal quality may include operations, features, means, or instructions for receiving an indication of a set of candidate BPLs for communications with the UE, the set of candidate BPLs including the group of two or more BPLs and receiving, for each candidate BPL of the set of candidate BPLs, an indication of a respective set of one or more candidate subbands for communications with the UE via the candidate BPL.

In some examples of the method, apparatuses, and non-transitory computer-readable medium described herein, receiving the indication of signal quality may include operations, features, means, or instructions for receiving a respective indication of one or more signal quality measurements for each of a set of multiple BPLs, where each indication of one or more signal quality measurements may be associated with a respective combination of a BPL within the set of BPLs and a respective subband within the frequency range.

In some examples of the method, apparatuses, and non-transitory computer-readable medium described herein, the indication of signal quality includes a first signal quality measurement and one or more other signal quality measurements each indicating a respective difference relative to the first signal quality measurement.

Some examples of the method, apparatuses, and non-transitory computer-readable medium described herein may further include operations, features, means, or instructions for transmitting, based on the indication of signal quality, an indication of one or more pairs of BPLs within the set of BPLs for communications with the UE, the indication of the one or more pairs of BPLs including one or more QCL properties for each of the pairs of BPLs and communicating with the UE via the one or more pairs of BPLs.

Some examples of the method, apparatuses, and non-transitory computer-readable medium described herein may further include operations, features, means, or instructions for transmitting an indication of a repetition of the set of multiple wideband reference signals, where transmitting the set of multiple wideband reference signals may be in accordance with the repetition.

8

Figure 6:
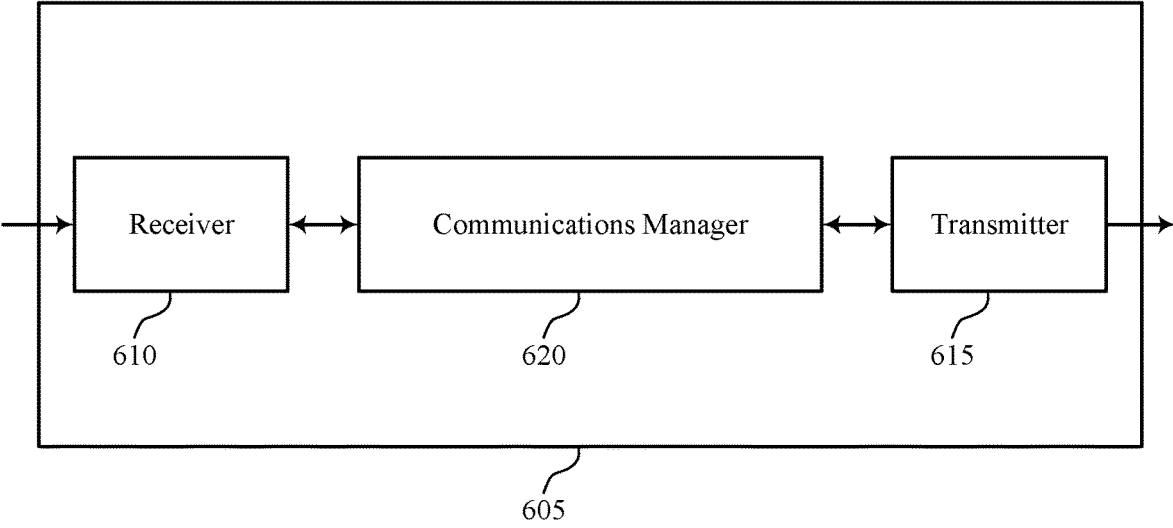
Figure 7:
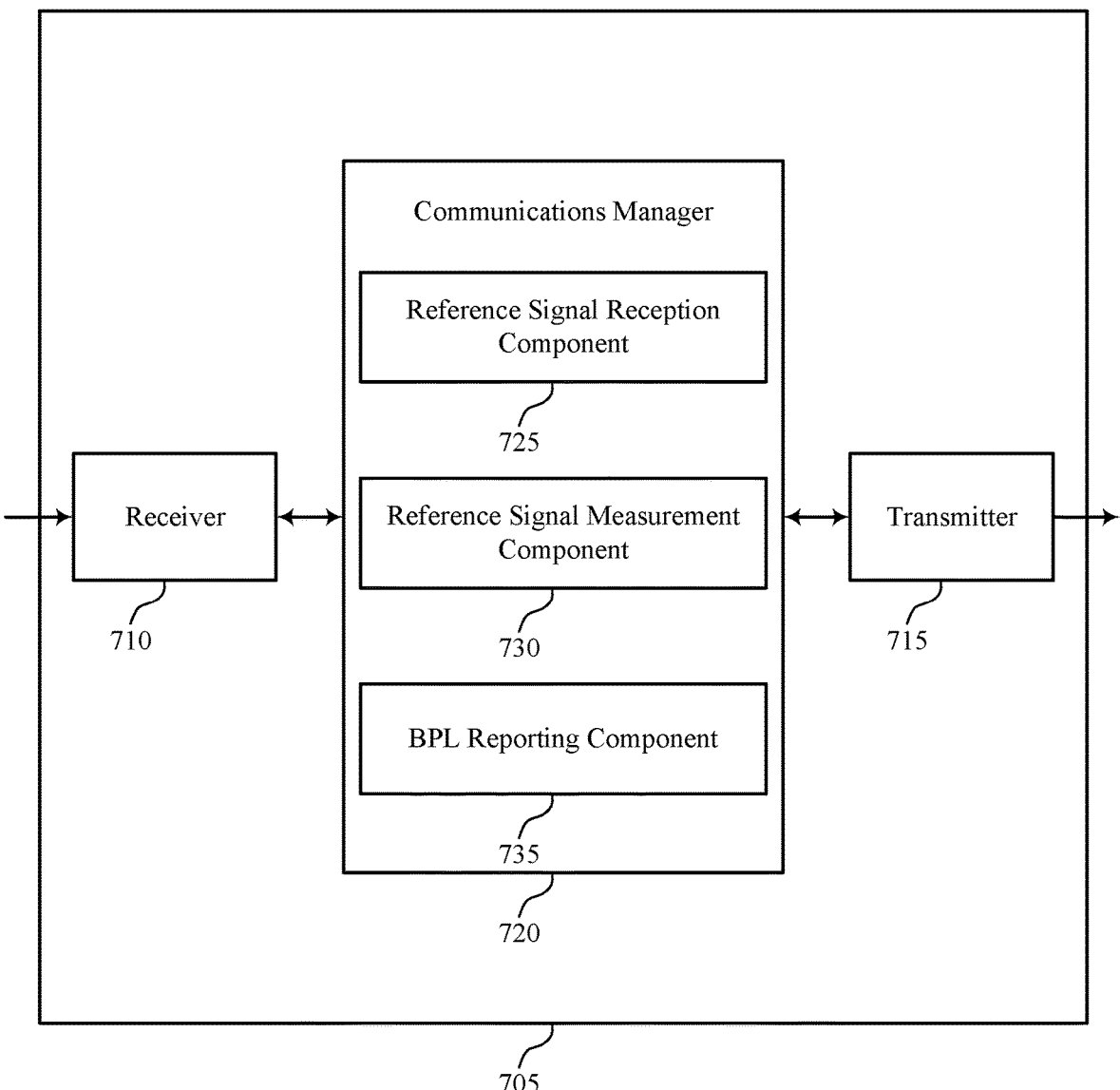

FIGS. 6 and 7 show block diagrams of devices that support subband-based reporting for concurrent BPLs in accordance with aspects of the present disclosure.

Figure 8:
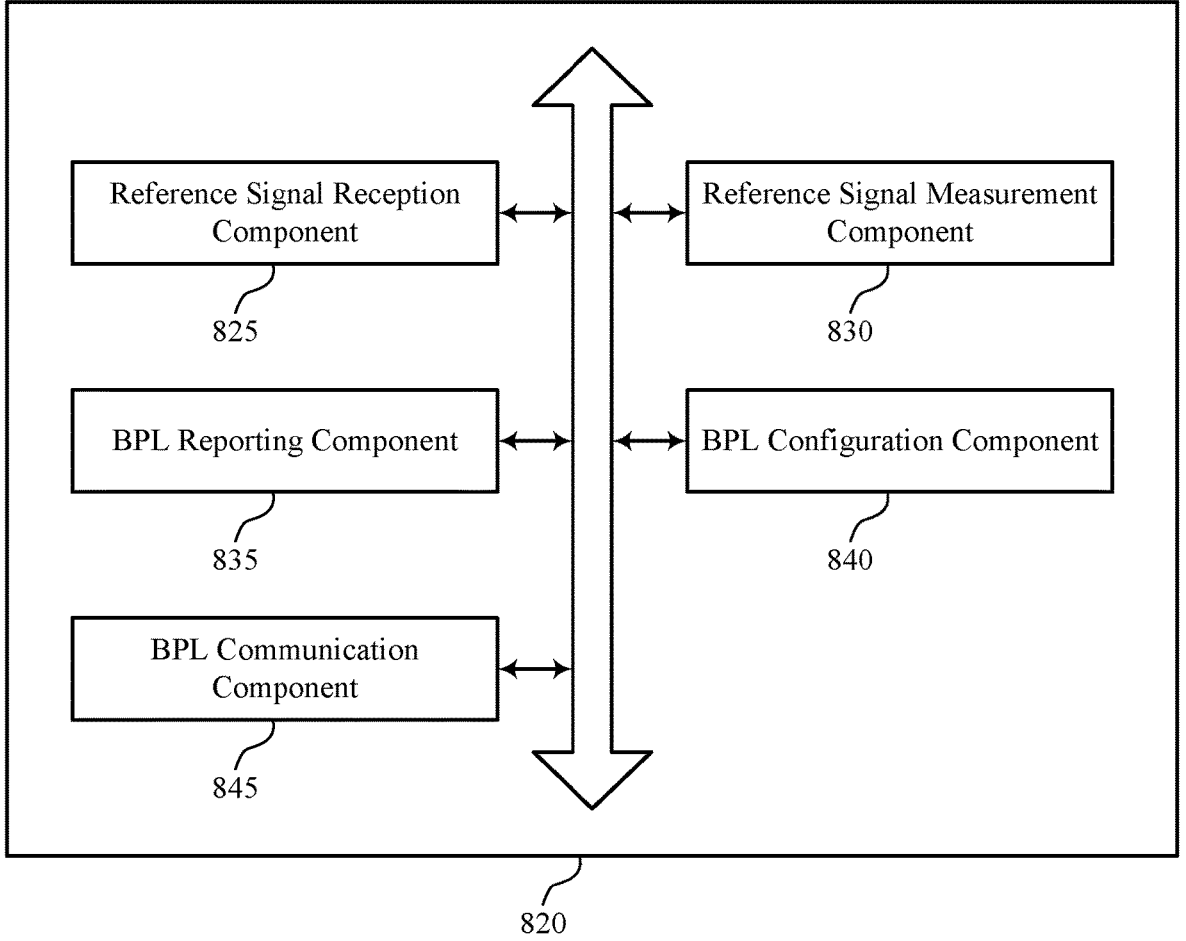

FIG. 8 shows a block diagram of a communications manager that supports subband-based reporting for concurrent BPLs in accordance with aspects of the present disclosure.

Figure 9:
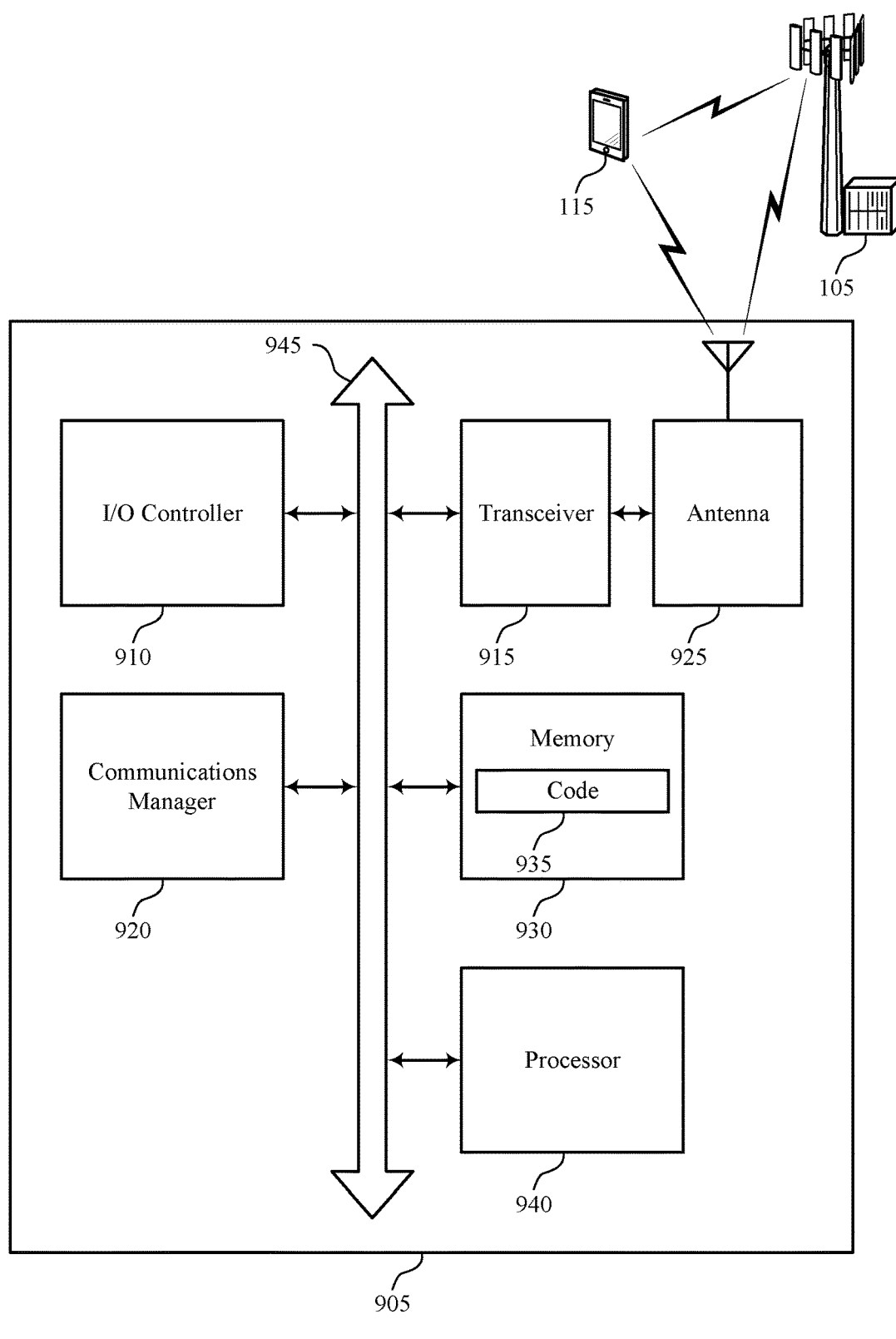

FIG. 9 shows a diagram of a system including a device that supports subband-based reporting for concurrent BPLs in accordance with aspects of the present disclosure.

Figure 10:
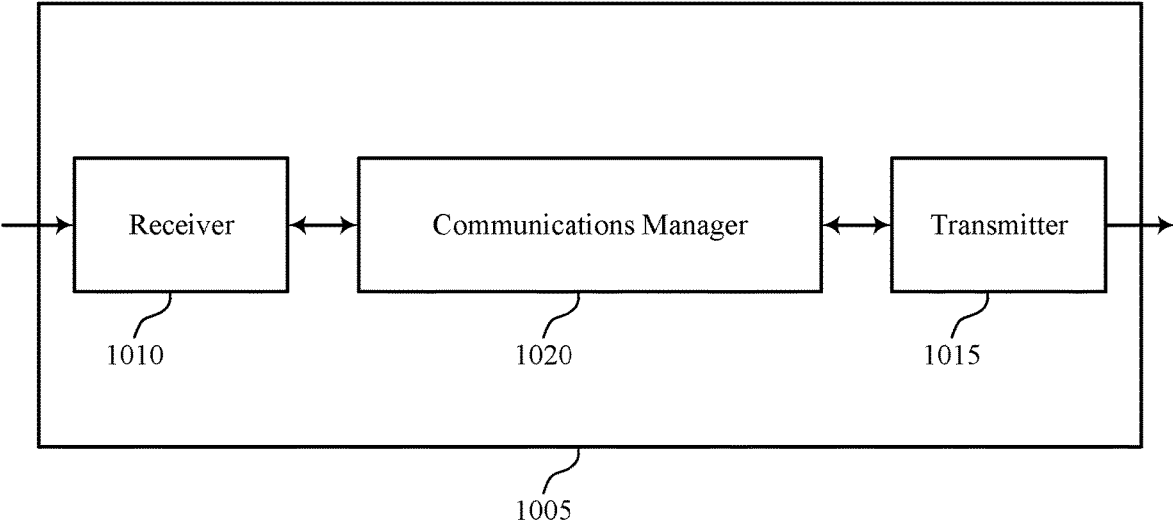
Figure 11:
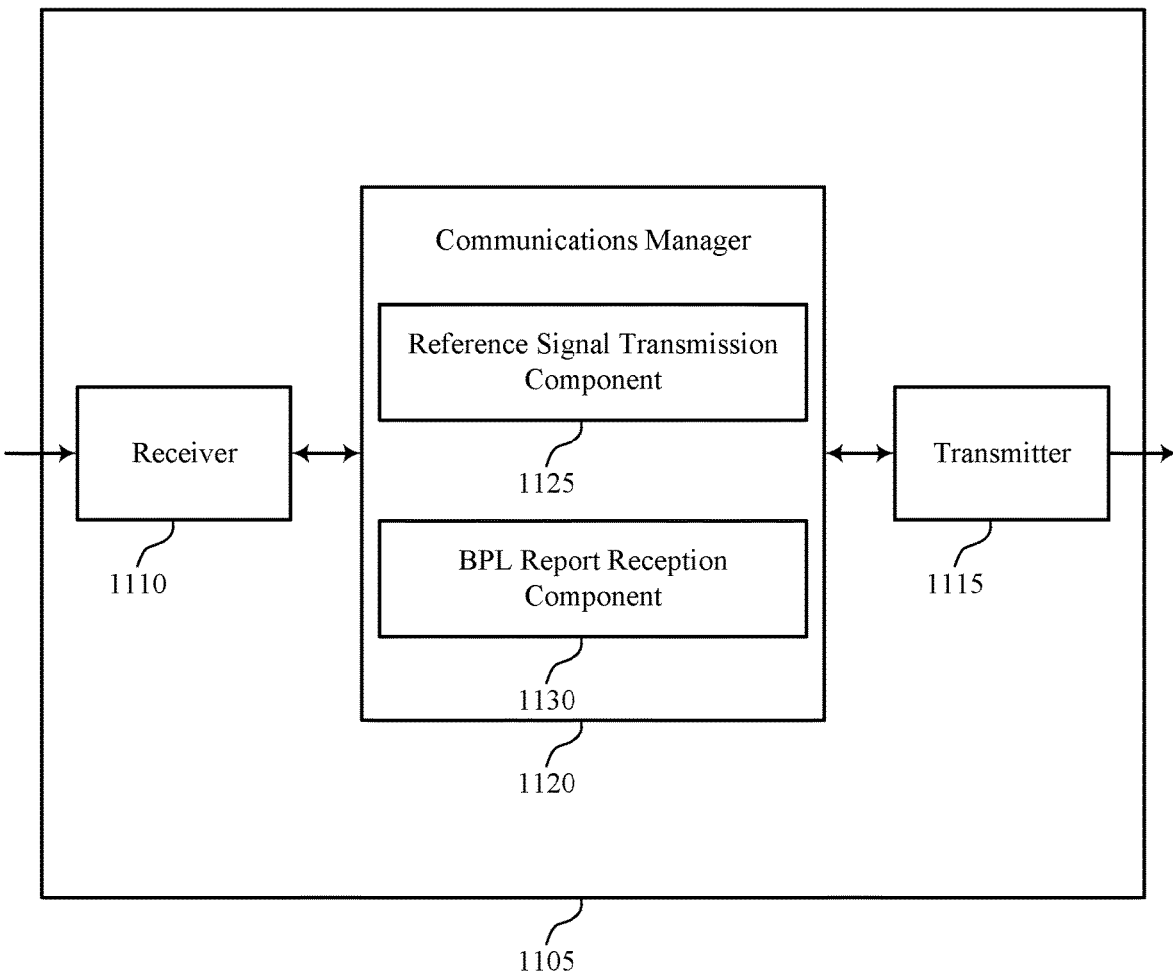

FIGS. 10 and 11 show block diagrams of devices that support subband-based reporting for concurrent BPLs in accordance with aspects of the present disclosure.

Figure 12:
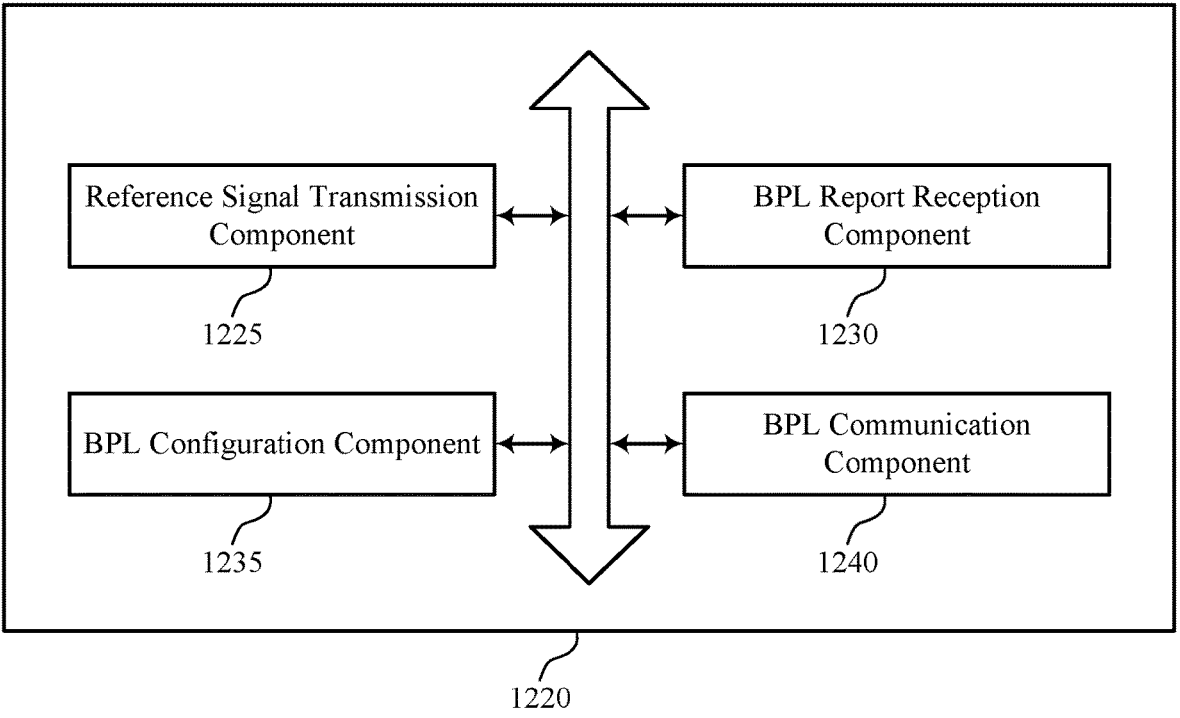

FIG. 12 shows a block diagram of a communications manager that supports subband-based reporting for concurrent BPLs in accordance with aspects of the present disclosure.

Figure 13:
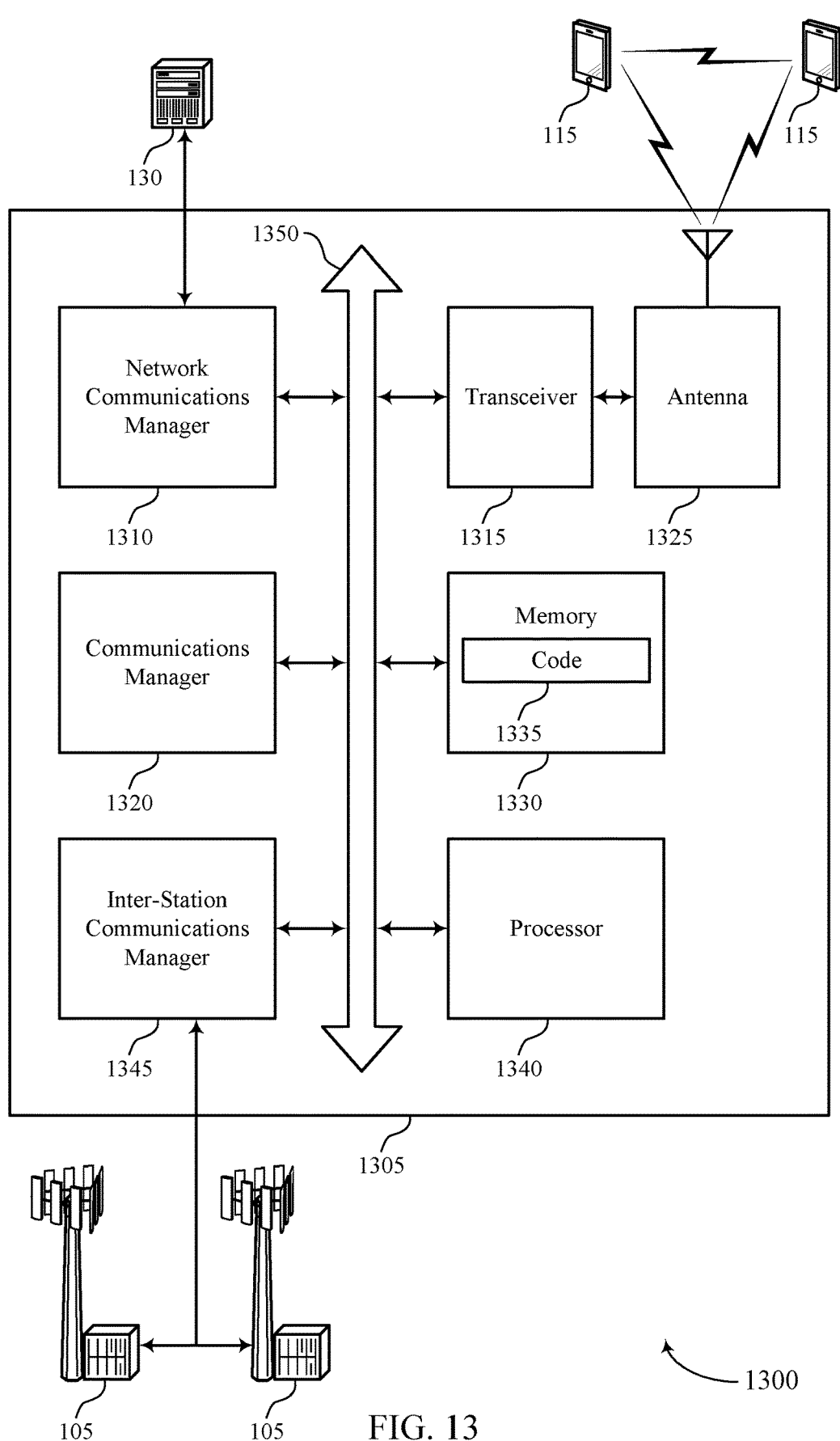

FIG. 13 shows a diagram of a system including a device that supports subband-based reporting for concurrent BPLs in accordance with aspects of the present disclosure.

FIGS. 14 through 17 show flowcharts illustrating methods that support subband-based reporting for concurrent BPLs in accordance with aspects of the present disclosure.

DETAILED DESCRIPTION

A base station and a user equipment (UE) may communicate with each other via one or more beam pair links (BPLs), where each BPL may include a respective transmit beam and respective receive beam. In some cases, the base station and the UE may communicate in the downlink or uplink via two BPLs (e.g., two or more BPLs) that may operate concurrently, which may increase throughput and/or communication quality at the UE and base station. Each BPL may be associated with one or more quasi co-location (QCL) relations. A QCL relation may indicate whether a first signal (e.g., or functional channel) shares one or more wireless properties (e.g., common, large-scale wireless properties) with another, previous signal (e.g., or functional channel). For example, a QCL relation may be used to more quickly determine the one or more wireless properties for the first signal (e.g., based on the relationship to the one or more wireless properties of the previous signal), which may reduce signaling overhead and antenna configuration time, among other examples.

The base station may indicate the two or more concurrently used BPLs to the UE using respective QCL relationships for each BPL. Communicating using multiple, concurrent BPLs may be based on BPLs that are selected such that inter-BPL interference is reduced or minimized. A beamforming pattern (e.g., used by a transmit beam and/or receive beam of a BPL) may be optimized for a certain direction at a certain frequency (e.g., frequency range). Deviating from this frequency may create a drift or shift in beam direction, which may be referred to as beam squint.

In some cases, the base station (e.g., communication links used by the base station) may operate over a wideband frequency range or channel, but may use beams that are configured for operation on (e.g., optimized for) a subset of the wideband. For example, the UE may be configured to operate on a portion of the wideband, which may be referred to as a subband, and may report joint BPL information that is for the subband, but may not apply to other subbands of the wideband. As such, if the UE and base station switch from a first subband (e.g., for which the BPLs are configured) to a second subband, beam squint may occur, which may shift a direction of the BPLs used by the UE and the base station and may result in a reduction in signal quality. For example, beam squint may result in a failure to receive a communication via a BPL (e.g., completely or fully receive the communication), or may result in higher interference for one or more concurrently transmitted BPLs.

The present disclosure provides techniques for concurrent BPL measurement and reporting to be performed on a subband basis, which may increase signal quality, for example, by supporting avoidance of inter-BPL interference and/or BPL failure when switching between subbands. For example, the UE may determine (e.g., based on one or more measurements) and report information to base station that may support selection of two or more BPLs per subband, such as BPLs having a highest signal quality for that subband.

The base station may configure the UE to measure one or more wideband reference signals for each of a set of BPLs, for joint BPL selection, and the UE may receive the wideband reference signals. The UE may perform measurements for each of the set BPLs at a subband level and may report signal qualities for the different BPL combinations at a subband level. For example, the UE may measure different combinations of transmit beams and receive beams (e.g., may measure different BPLs) over multiple antenna panels, on a subband basis. The UE may report information based on the measurements that may support selection of BPLs for multi-panel and multi-beam operation for one or more subbands.

The UE may report the joint BPL information (e.g., a signal quality for two or more BPLs) to base station using one or more techniques. In a first example, the UE may report a preferred set of subbands for multi-beam operation, and two or more preferred BPLs for each subband. In a second example, the UE may report a preferred set of BPLs and a list of preferred subbands for each BPL. In a third example, the UE may report its signal quality measurements, or a subset of the measurements, to base station for indicated BPLs and subbands.

The base station may receive the report from the UE and may configure two or more BPLs for communications in a subband based on the report. If the base station and the UE switch to a second subband for communications, the base station may indicate two or more BPLs for the second subband based on the report from the UE, where the two or more BPLs for the second subband may be the same or different from the two or more BPLs for the first subband. Based on using the report of BPL signal quality provided by the UE to select two or more BPLs, communication quality between the base station and the UE may increase (e.g., based on using BPLs configured to have a higher quality for a subband).

Aspects of the disclosure are initially described in the context of wireless communications systems. Aspects of the disclosure are further illustrated by and described with reference to a measurement scheme, a reporting scheme, a process flow, apparatus diagrams, system diagrams, and flowcharts that relate to subband-based reporting for concurrent BPLs.

Figure 1:
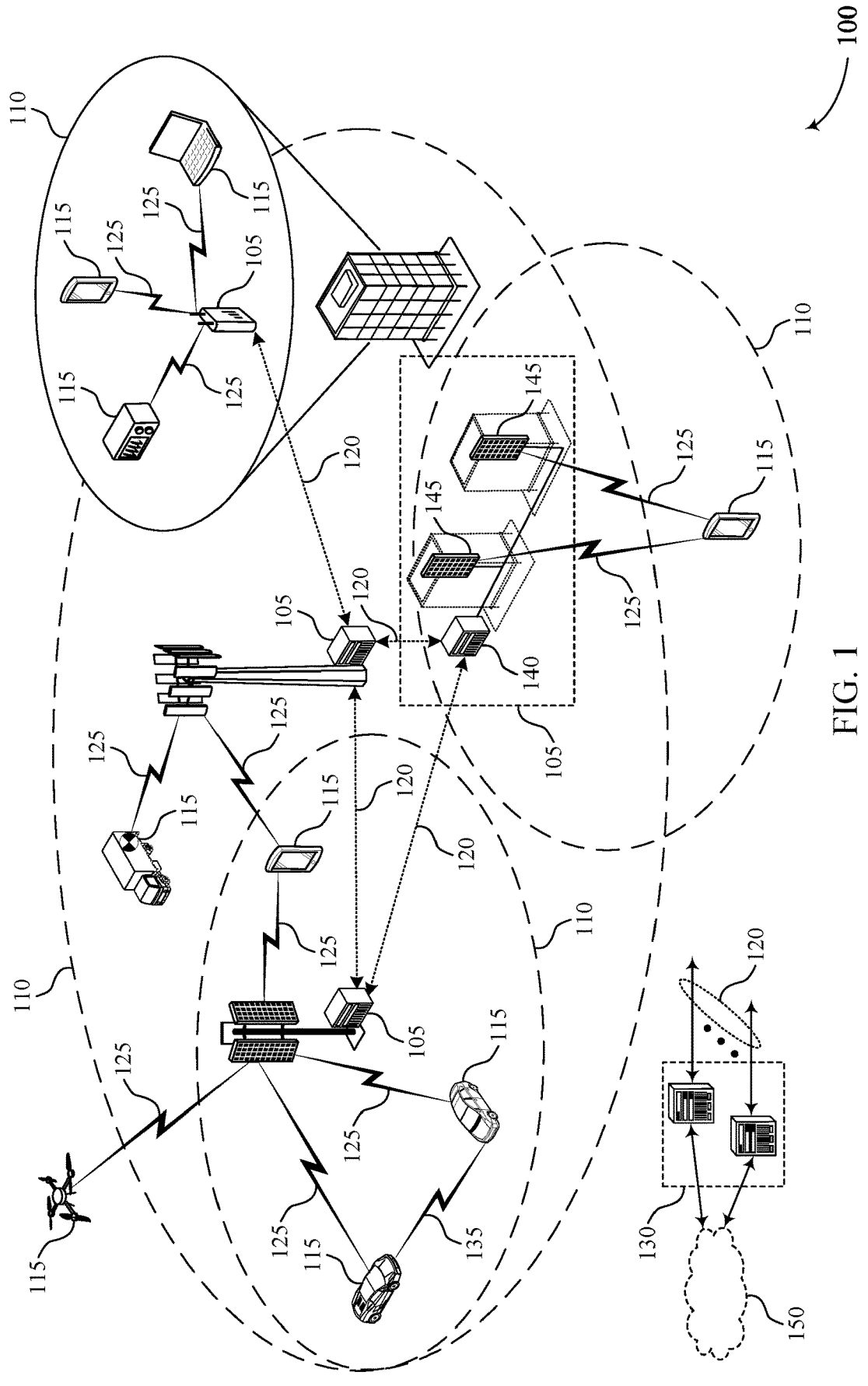
FIG. 1 illustrates an example of a wireless communications system that supports subband-based reporting for concurrent beam pair links (BPLs) in accordance with aspects of the present disclosure.

FIG. 1 illustrates an example of a wireless communications system 100 that supports subband-based reporting for concurrent BPLs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) communications. The UEs 115 may be designed to support ultra-reliable or low-latency functions. Ultra-reliable communications may include private communication or group communication. Support for such functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peerto-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting.

MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna array's (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may determine (e.g., based on one or more measurements) and report information to a base station 105 that may support selection of two or more BPLs per subband, such as BPLs having a highest signal quality for that subband. The base station 105 may configure the UE 115 to measure one or more wideband reference signals transmitted by the base station 105 for each of a set of BPLs, for joint BPL selection, and the UE 115 may receive the wideband reference signals. The UE 115 may perform measurements for each of the set BPLs at a subband level and may report signal qualities for the different BPL combinations at a subband level. For example, the UE 115 may measure different combinations of transmit beams and receive beams (e.g., may measure different BPLs) over multiple antenna panels, on a subband basis. The UE 115 may report information based on the measurements that may support selection of BPLs for multi-panel and multi-beam operation for one or more subbands.

Figure 2A:
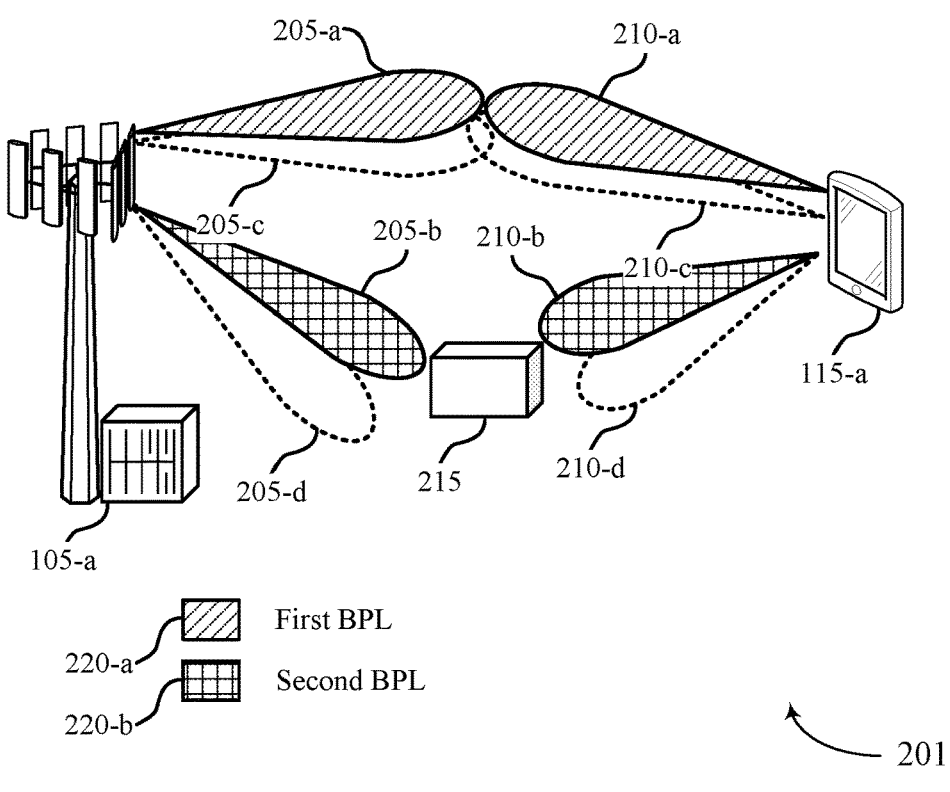
FIGS. 2A and 2B illustrates an example of a wireless communications system that supports subband-based reporting for concurrent BPLs in accordance with aspects of the present disclosure.
Figure 2B:
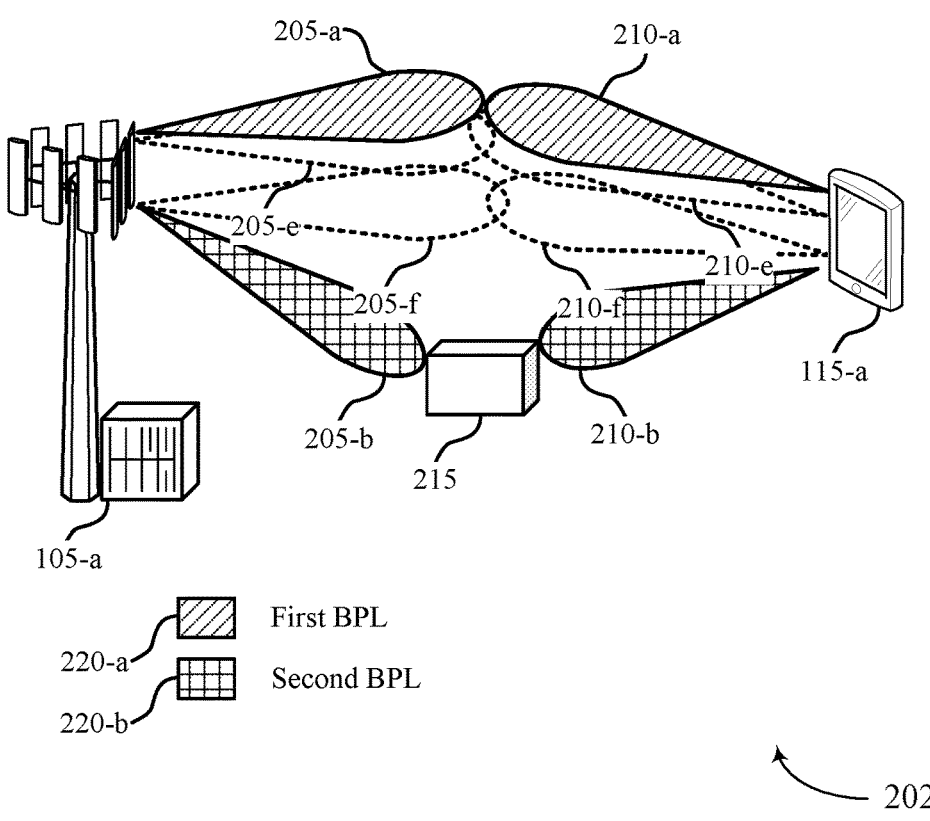

FIGS. 2A and 2B illustrate examples of wireless communications systems 201 and 202 that support subband-based reporting for concurrent BPLs in accordance with aspects of the present disclosure. In some examples, wireless communications systems 201 and 202 may implement some aspects of wireless communications system 100. For example, wireless communications systems 201 and 202 may include a base station 105-*a* and a UE 115-*a*, which may represent examples of a base station 105 and a UE 115 as described with reference to FIG. 1. Base station 105-*a* and UE 115-*a* may communicate with each other via one or more BPLs 220, where each BPL may include a respective transmit beam 205 and respective receive beam 210.

For example, base station 105-*a* and UE 115-*a* may communicate in the downlink or the uplink via two BPLs 220 that may operate concurrently (e.g., base station 105-*a* and UE 115-*a* may communicate concurrently using the two BPLs 220). The two BPLs 220 may include, for example, a first BPL 220-*a* having a transmit beam 205-*a* and a receive beam 210-*a* and a second BPL 220-*b* having a transmit beam 205-*b* and a receive beam 210-*b*. In some examples, UE 115-*a* and base station 105-*a* may communicate using transmit beams 205 on the UE side and receive beams 210 on the base station side (e.g., in the uplink). For example, UE 115-*a* may use two transmit beams 205 that generally correspond to receive beams 210-*a* and 210-*b* and base station 105-*a* may use two receive beams 210 that generally correspond to transmit beams 205-*a* and 205-*b*. Communicating concurrently via two or more BPLs 220 (e.g., via BPLs 220-*a* and 220-*b*) may increase throughput and/or communication quality at UE 115-*a*.

Each BPL 220 (e.g., each combination of a receive beam 210 and a transmit beam 205) used by base station 105-*a* and UE 115-*a* may be associated with one or more QCL relations. A QCL relation may indicate whether a first signal (e.g., or functional channel) shares one or more wireless properties (e.g., common, large-scale wireless properties) with another, previous signal (e.g., or functional channel). For example, a QCL relation may be used to more quickly determine the one or more wireless properties for the first signal (e.g., based on the relationship to the one or more wireless properties of the previous signal), which may reduce signaling overhead and antenna configuration time, among other examples. The one or more wireless properties shared by the two signals may, for example, be an average delay, a delay spread, a Doppler shift, a Doppler spread, a same receive spatial filter (e.g., they are received from a same direction), or any combination thereof (e.g., among other examples).

As such, a QCL relationship may be used to describe whether two antenna ports that relate to physical channels and/or references signals experience one or more common wireless properties (e.g., large-scale wireless properties and/ or spatial receive relationship). UE 115-*a* may use an indicated QCL relationship for channel estimation and beam operation for different physical channels and symbols.

Different types of QCL or QCL relationships may be used to indicate different shared wireless properties. For example, a QCL type A may indicate a shared average delay, delay spread, Doppler shift, and Doppler spread. A QCL type B may indicate a shared Doppler shift and Doppler spread, while a QCL type C may indicate a shared average delay and Doppler shift. A QCL type D may indicate a shared spatial receive relationship. For each BPL 220, base station 105-*a* may indicate a transmission configuration indicator (TCI) state and one or more QCL relationships for the BPL 220. Each QCL relationship may, for example, indicate a respective QCL type (e.g., type A, B, C, or D) and a previous signal or channel (e.g., a synchronization signal block (SSB), a channel state information reference signal (CSI-RS)) that shares the QCL relationship.

As described herein, in some cases, UE 115-*a* and base station 105-*a* may communicate by concurrently using multiple BPLs 220. Such multi-beam operations may be supported, for example, if base station 105-*a* and UE 115-*a* have multiple antenna panels (e.g., one panel for each BPL 220). When communicating using multiple, concurrent BPLs 220 may be based on BPLs 220 that are selected such that inter-BPL interference is reduced or minimized.

For example, UE 115-*a* may determine whether jointly used (e.g., concurrently used) BPLs 220 cause mutual interference (e.g., a reduction in channel rank) or whether the BPLs 220 are useable (e.g., optimized) for joint transmission. UE 115-*a* may determine one or more measurements of signal quality for two or more concurrently used BPLs 220, such as measurements of one or more wideband reference signals for each BPL 220. UE 115-*a* may determine a BPL combination for multi-panel, multi-beam operation based on the one or more measurements. For example, UE 115-*a* may determine the BPL combination by solving an optimization problem (e.g., by maximizing an approximate sum-rate) that uses the one or more measurements. UE 115-*a* may report the potential BPL combination or the one or more measurements to base station 105-*a*, and base station 105-*a* may configure two or more BPLs 220 (e.g., BPLs 220-*a* and 220-*b*) based on the report from UE 115-*a*.

In such cases, base station 105-*a* may indicate the two or more BPLs 220 to UE 115-*a* using respective QCL relationships for each BPL 220. For each BPL 220, base station 105-*a* may indicate a transmission configuration indicator (TCI) state and one or more QCL relationships for the BPL 220. Each QCL relationship may, for example, indicate a respective QCL type (e.g., type A, B, C, or D) and a previous signal or channel (e.g., an SSB, a CSI-RS) that shares the QCL relationship. The QCL relationships indicated by base station 105-*a* may be configured to support joint or concurrent BPL usage (e.g., the QCL relationships may apply to the BPLs 220 without resulting in high inter-beam interference), and thus, in some cases, may be referred to as joint QCL relationships.

A beamforming pattern (e.g., used by a transmit beam 205 and/or receive beam 210 of a BPL 220) may be optimized for a certain direction at a certain frequency (e.g., frequency range). Deviating from this frequency may create a drift or shift in beam direction, which may be referred to as beam squint. And in some cases, base station 105-*a* (e.g., communication links used by base station 105-*a*) may operate over a wideband frequency range or channel, but may use beams that are configured for operation on (e.g., optimized for) a subset of the wideband. For example, UE 115-*a* may be configured to operate on a portion of the wideband, which may be referred to as a subband, and may report joint-BPL information that is for the subband, but may not apply to other subbands of the wideband. As such, if UE 115-*a* and base station 105-*a* switch from a first subband (e.g., for which the BPLs 220 are configured) to a second subband, beam squint may occur, which may shift a direction of the BPLs 220 used by UE 115-*a* and base station 105-*a* and may result in a reduction in signal quality.

In a first example, the beam squint may result in BPL failure, which may be illustrated by FIG. 2A. In such cases, transmit beam 205-*a* and receive beam 210-*a* may drift to transmit beam 205-*c* and receive beam 210-*c*, respectively. Similarly, transmit beam 205-*b* and receive beam 210-*b* may drift to transmit beam 205-*d* and receive beam 210-*d*, respectively. Based on the drift experienced by BPL 220-*b*, BPL failure may occur. For example, a reference signal received power (RSRP) associated with BPL 220-*b* may drop, which may result in a failure to receive a communication via BPL 220-*b* (e.g., completely or fully receive the communication).

In a second example, the beam squint may result in higher inter-BPL interference, which may be illustrated by FIG. 2B. In such cases, transmit beam 205-*a* and receive beam 210-*a* may drift to transmit beam 205-*e* and receive beam 210-*e*, respectively. Similarly, transmit beam 205-*b* and receive beam 210-*b* may drift to transmit beam 205-*f* and receive beam 210-*f*, respectively. Based on the drift experienced by BPLs 220-*a* and 220-*b*, inter-BPL interference may increase, which may reduce a signal to interference plus noise ratio (SINR) for both BPLs 220 (e.g., both antenna panels) and may degrade the determined sum-rate (e.g., to optimize the concurrent use of the BPLs 220).

The present disclosure provides techniques for measurement and reporting related to the concurrent use of two or more BPLs to be performed on a subband basis (e.g., a per-subband basis, a subband-specific basis), which may increase signal quality, for example, by supporting avoidance of inter-BPL interference and/or BPL failure when switching between subbands. For example, UE 115-*a* may determine (e.g., based on one or more measurements) and report information to base station 105-*a* that may support selection of two or more BPLs 220 per subband having a highest signal quality for that subband.

Base station 105-*a* may configure UE 115-*a* to measure one or more wideband reference signals for each of a set of BPLs 220 (e.g., BPLs 220-*a* and 220-*b*), for joint-BPL selection, and UE 115-*a* may receive the wideband reference signals. UE 115-*a* may perform measurements for each of the set BPLs 220 at a subband level (e.g., as received within one or more specific subbands) and may report signal qualities for the different BPL combinations at a subband level. For example, UE 115-*a* may measure different combinations of transmit beams 205 and receive beams 210 (e.g., may measure different BPLs 220) over multiple antenna panels, on a subband basis. The measurements may be, for example, an RSRP, reference signal received quality (RSRQ), SINR, or the like, for each BPL 220. UE 115-*a* may report information based on the measurements that may support derivation of joint QCL relationships over different subbands at base station 105-*a*, which may also support selection of BPLs 220 for multi-panel and multi-beam operation for one or more subbands. Such measurement and reporting may be referred to as a beam management procedure performed by base station 105-*a* and UE 115-*a*.

In some cases, UE 115-*a* and base station 105-*a* may communicate their respective multi-panel and multi-beam capabilities, where the subband-based measurement and reporting of joint-BPLs 220 may be based on the capabilities. In some cases, base station 105-*a* may configure one or more subbands for the measurement and reporting and may signal the one or more subbands to UE 115-*a*. In some other cases, UE 115-*a* may determine or select one or more subbands for the measurement and reporting. In some cases, base station 105-*a* may configure repeated wideband reference signal resources for the subband-based measurement and reporting, for example, such that UE 115-*a* may conduct measurements on different BPLs 220 using the repeated resources, or measurements on different subbands using the repeated resources.

Base station 105-*a* or UE 115-*a* may, in some examples, activate the subband-based measurement and reporting, such as via an RRC message, a MAC control element (MAC-CE), downlink control information (DCI), uplink control information (UCI), or any combination thereof. In some cases, a message indicating the activation may indicate for UE 115-*a* to report a best number K of BPLs 220 for one or more indicated subbands. In the activation message, base station 105-*a* may also configure a periodicity of measurements and/or a periodicity of reporting.

UE 115-*a* may report the joint-BPL information (e.g., a signal quality for two or more BPLs 220) to base station 105-*a* using one or more techniques. In a first example, UE 115-*a* may report a preferred set of subbands for multi-beam operation, and two or more preferred BPLs 220 for concurrent use in each preferred subband. In a second example, UE 115-*a* may report one or more preferred sets of BPLs 220 for current use and a list of preferred subbands for each preferred set of BPLs 220. In a third example, UE 115-*a* may report its signal quality measurements (e.g., RSRP, RSRQ, SINR), or a subset of the measurements, to base station 105-*a* for indicated BPLs 220 and subbands.

Base station 105-*a* may receive the report from UE 115-*a* and may configure two or more BPLs 220 for concurrent communications in a subband based on the report. For example, base station 105-*a* may configure BPLs 220-*a* and 220-*b* for communications with UE 115-*a* in a first subband, and may indicate BPLs 220-*a* and 220-*b* to UE 115-*a* (e.g., along with any respective QCL relationships for the BPLs 220). If base station 105-*a* and UE 115-*a* switch to a second subband for communications, base station 105-*a* may indicate two or more BPLs for concurrent use the second subband based on the report from UE 115-*a*, where the two or more BPLs for the second subband may be the same or different from the two or more BPLs for the first subband. Based on using the report of BPL signal quality provided by UE 115-*a* to select two or more BPLs 220, communication quality between base station 105-*a* and UE 115-*a* may increase (e.g., based on using BPLs 220 configured to have a higher quality for a subband).

Figure 3:
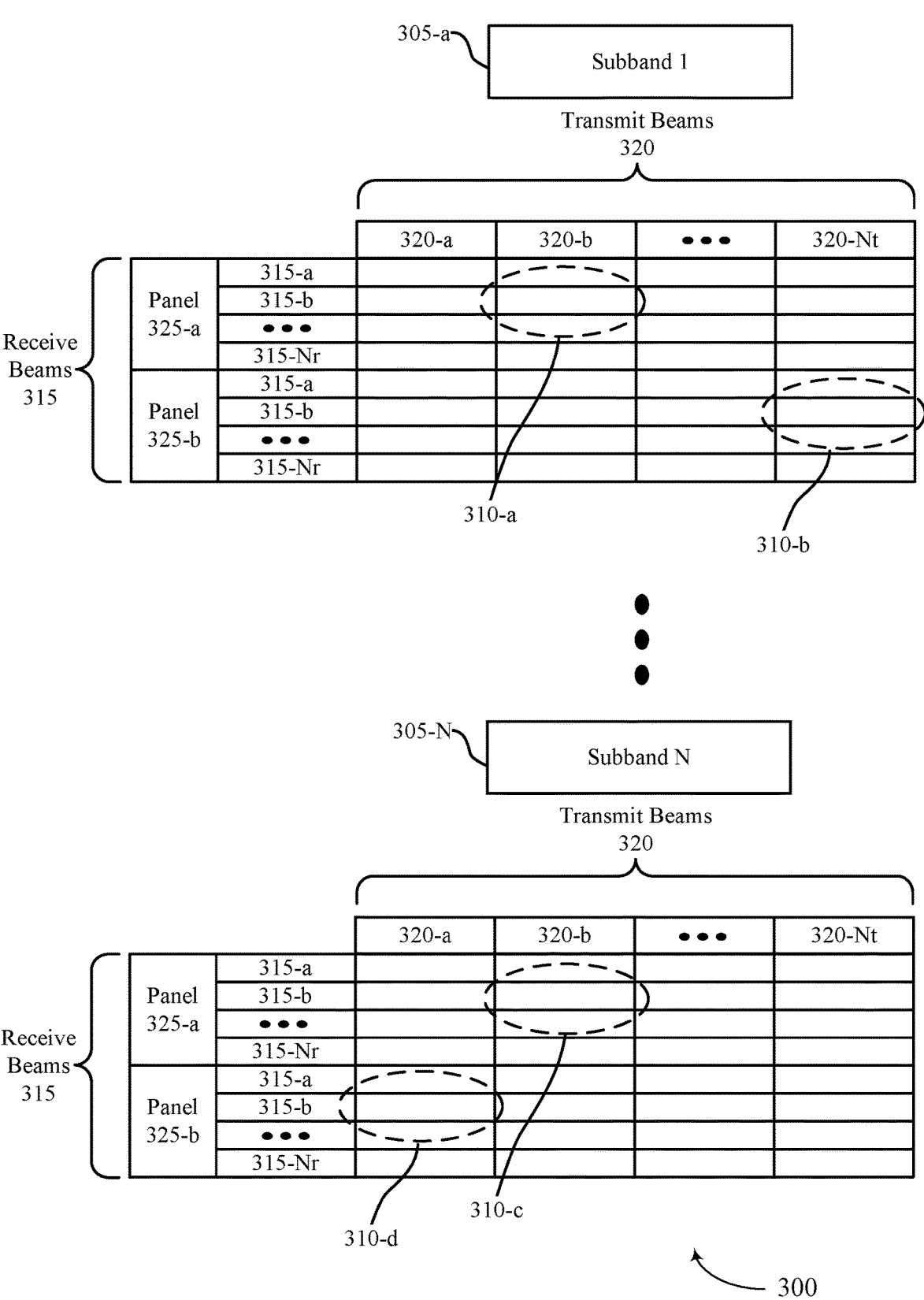
FIG. 3 illustrates an example of a measurement scheme that supports subband-based reporting for concurrent BPLs in accordance with aspects of the present disclosure.

FIG. 3 illustrates an example of a measurement scheme 300 that supports subband-based reporting for concurrent BPLs in accordance with aspects of the present disclosure. In some examples, some aspects of measurement scheme 300 may implement or be implemented by aspects of wireless communications system 100 or 200. For example, a UE 115 may use measurement scheme 300 to perform measurements and determine reporting information for two or more joint-BPLs, as described with reference to FIG. 2. The UE 115 may represent an example of a UE 115 described with reference to FIGS. 1 and 2.

As described with reference to FIG. 2, the UE 115 may perform respective measurements for one or more BPLs as concurrently received over a subband 305, based on two or more wideband reference signals concurrently transmitted using the BPLs (e.g., transmitted from a base station 105). A wideband reference signal over the BPL may be transmitted at the same time as another wideband reference signal over another BPL, such that the UE 115 may measure the joint effect of the BPLs. For example, a first concurrently transmitted BPL may be received (e.g., for measurement) via a first panel 325-*a* (e.g., antenna panel) and a second concurrently transmitted BPL may be received via a second panel 325-*b*. As illustrated in FIG. 3 and as described herein, the UE 115 may repeat such measurements over one or more other BPLs for the subband 305, as well as repeating the measurements over one or more other subbands 305.

Each BPL may include a different, respective combination of a transmit beam 320 and a receive beam 315. The UE 115 may determine, or may coordinate with the base station 105 to determine, the combinations of transmit beams 320 and receive beams 315 (e.g., determine or coordinate the BPLs) to use for performing the measurements (e.g., the subband-based BPL measurements). The UE 115 may additionally determine, or may coordinate with the base station 105 to determine, the combinations of the panels 325 to be used for receiving the determined BPLs. For example, each concurrently used transmit beam 320 may be generated by a different panel 325 at a transmitting device (e.g., the UE 115 or the base station 105) and each concurrently used receive beam 315 may be generated by a different panel 325 at the receiving device (e.g., the UE 115 or the base station 105).

The signaling for coordinating the BPLs and the panels 325 with the base station 105 may be based on communicating multi-beam and/or multi-panel capabilities of the base station 105 and the UE 115. Additionally or alternatively, the coordination signaling may be a part of signaling from the base station 105 to the UE 115 to activate the subband-based measuring and reporting. In any of the examples described herein, the base station 105 or the UE 115 may select, for example, one receive beam 315 or Nr receive beams 315 (e.g., from a receive beam 315-*a* to 315-Nr) for subband-based measurement and reporting. Similarly, the base station 105 or the UE 115 may select one transmit beam 320 or Nt transmit beams 320 (e.g., from a transmit beam 320-*a* to 320-Nt) for subband-based measurement and reporting. In some cases, the transmit and/or receive beams to measure and report may be different for different subbands 305.

The base station 105, the UE 115, or both, may also determine one or more subbands 305 for measurement and reporting. In a first example, the base station 105 may configure one or more subbands 305 for the subband-based measurement and reporting, and may indicate the one or more subbands 305 to the UE 115 (e.g., as a part of configuration signaling, or the above described coordination signaling). In a second example, the base station 105 may additionally or alternatively configure a respective priority for measuring each of one or more subbands 305, or may configure a preferred set of subbands 305 to be measured and reported.

In a third example, the UE 115 may select one or more subbands 305 for the subband-based measurement and reporting. For example, the UE 115 may select M subbands 305 out of N subbands configured for communications within the wideband, where M<N. In some cases, the UE 115 may select the one or more subbands 305 based on an indication from the base station 105, or based on a preconfigured setting of the UE 115. In any of the examples described herein, the base station 105 or the UE 115 may select, for example, one subband or N subbands 305 (e.g., from a subband 305-*a* to a subband 305-N) for subband-based measurement and reporting.

Based on the established or determined configuration of transmit beams 320, receive beams 315, and panels 325 for measurement and reporting at the subband-level, UE 115 may receive the respective wideband reference signals from the base station 105 and may perform the measurements on each of the respective wideband reference signals. Each wideband reference signal may be associated with one or more of a set of BPLs. For example, each wideband reference signal may be transmitted via a respective transmit beam 320, but may be received via one or more receive beams 315, where each different combination of the transmit beam 320 and the one or more receive beams 315 may represent a different BPL. The UE 115 may further measure each wideband reference signal over a corresponding subband of the wideband, for the subband-based measurement and reporting.

The UE 115 may measure or determine one or more signal quality values 310 based on the measurements of the respective wideband reference signals. For example, for subband 305-*a*, the UE 115 may determine a signal quality value 310-*a* for a first BPL (e.g., transmit beam 320-*b* and receive beam 315-*b* on panel 325-*a*), based on a respective reference signal measurement, and may determine a signal quality value 310-*b* for a second BPL (e.g., transmit beam 320-Nt and receive beam 315-*b* on panel 325-*b*), based on a respective reference signal measurement. In some cases, the UE 115 may also measure one or more other BPLs for subband 305-*a*. Similarly, for subband 305-N, the UE 115 may determine a signal quality value 310-*c* for a first BPL (e.g., transmit beam 320-*b* and receive beam 315-*b* on panel 325-*a*), based on a respective reference signal measurement, and may determine a signal quality value 310-*d* for a second BPL (e.g., transmit beam 320-*a* and receive beam 315-*b* on panel 325-*b*), based on a respective reference signal measurement. The UE 115 may also perform similar measurements for intervening subbands 305, if any, between subband 305-*a* and subband 305-N.

The BPLs measured for the different subbands 305 may, in some cases, be the same BPLs (e.g., such as for signal quality values 310-*a* and 310-*c*), different BPLs (e.g., such as for signal quality values 310-*b* and 310-*d*), or any combination thereof. The signal quality values 310 may be, among other examples, an RSRP value, an RSRQ value, an SINR value, or any combination thereof. In some cases, the UE 115 may determine the signal quality values 310 on a subband-level (e.g., determine the values for all the BPLs on one subband 305 at a time). In some other cases, the UE may determine the signal quality values 310 on a BPL level (e.g., determine the values for all subbands 305, one BPL at a time).

The UE 115 may perform such measurements based on a periodicity that may, for example, be configured by the base station 105 for the subband-based measurement and reporting. The periodicity may indicate a periodic, semi-persistent, or aperiodic measurement configuration, among other examples. Based on the measurements and determined signal quality values 310, the UE 115 may determine information (e.g., information indicative of a BPL signal quality) to report to the base station 105. The determination and reporting of the signal quality are further described herein with reference to FIG. 4.

Figure 4A:
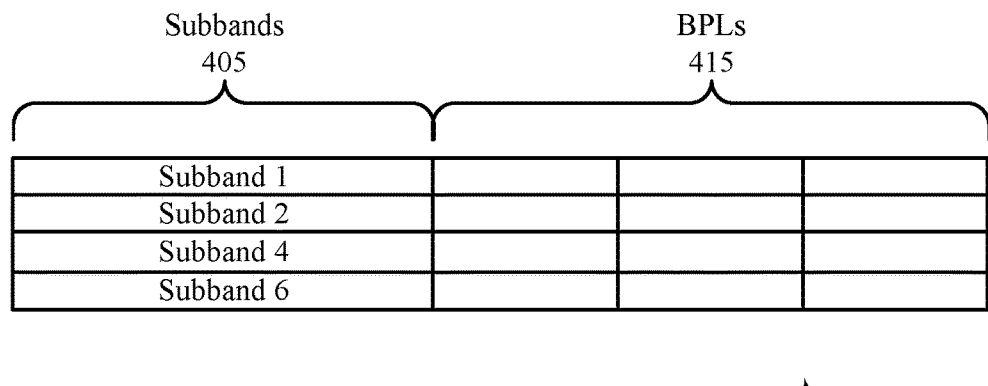
FIG. 4A-4C illustrates an example of a reporting scheme that supports subband-based reporting for concurrent BPLs in accordance with aspects of the present disclosure.
Figure 4B:
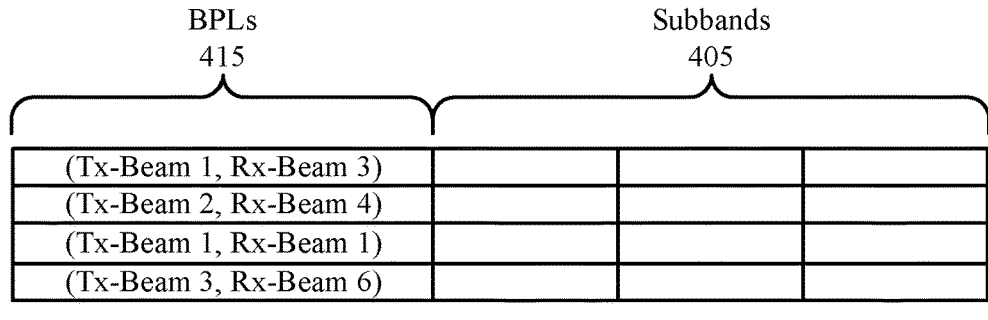
Figure 4C:
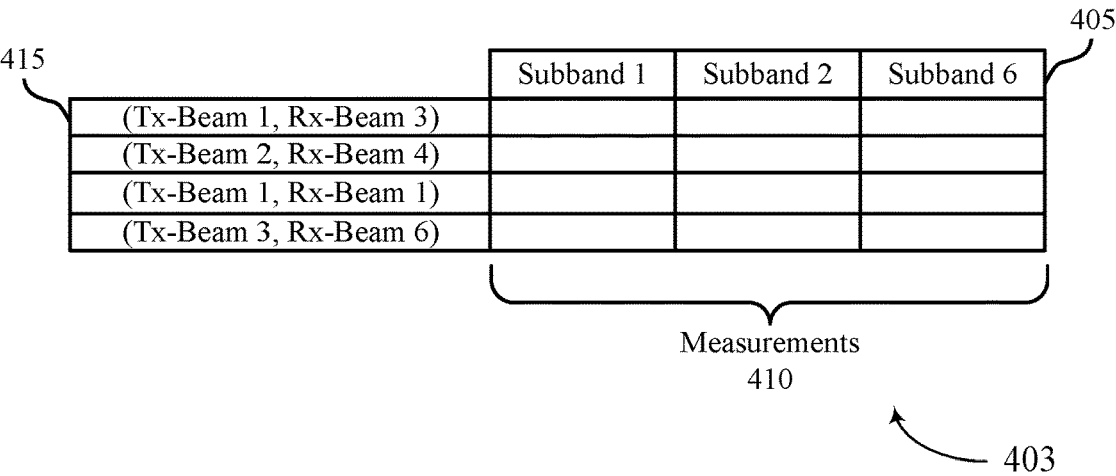

FIGS. 4A, 4B, and 4C illustrate examples of reporting schemes 401, 402, and 403 that support subband-based reporting for concurrent BPLs in accordance with aspects of the present disclosure. In some examples, some aspects of reporting scheme 400 may implement or be implemented by aspects of wireless communications system 100 or 200. For example, a UE 115 may use reporting scheme 400 determine and report information indicative of a signal quality for two or more joint-BPLs, as described with reference to FIGS. 2 and 3. The UE 115 may represent an example of a UE 115 described with reference to FIGS. 1-3.

As described with reference to FIGS. 2 and 3, the UE 115 may perform respective measurements for two or more BPLs 415 over one or more subbands 405. The UE 115 may use signal quality values for each of the BPLs 415 in the respective subband 405 to determine and transmit information indicative of a signal quality of the BPLs 415.

In a first example, illustrated by FIG. 4A, the UE 115 may determine a preferred set of subbands 405 to be used for multi-beam operation (e.g., for joint-BPL communications with a base station 105, based on the measurements of the two or more BPLs 415). The UE 115 may also determine a respective list of preferred BPLs 415 for each subband 405, for multi-beam operation via two or more of the preferred BPLs 415, and may report the subbands 405 and the corresponding BPLs 415 to the base station 105. In one example, the UE 115 may select a subband 1, subband 2, subband 4, and subband 6 for communications and may indicate one or more respective BPLs 415 for each subband 405. In some cases, different subbands 405 may be reported or associated with different quantities of BPLs 415. Other examples may apply, for example, to include any number of subbands 405, and any number of BPLs 415 for each subband 405, without departing from the scope of the present disclosure.

In a second example, illustrated by FIG. 4B, the UE 115 may determine a preferred set of BPLs 415 to be used for multi-beam operation (e.g., for joint-BPL communications with a base station 105 via two or more of such BPLs 415, based on the measurements of the two or more BPLs 415). The UE 115 may also determine a respective list of preferred subbands 405 for each BPL 415, and may report the BPLs 415 and the corresponding subbands 405 to the base station 105. In one example, the UE 115 may select a first BPL (e.g., a transmit beam 1 and receive beam 3), a second BPL (e.g., a transmit beam 2 and a receive beam 4), a third BPL (e.g., a transmit beam 1 and a receive beam 1), and a fourth BPL (e.g., a transmit beam 3 and a receive beam 6) for communications and may indicate one or more respective subbands 405 for each BPL 415. In some cases, different BPLs 415 may be reported or associated with different quantities of subbands 405. Other examples may apply, for example, to include any number of BPLs 415, and any number of subbands 405 for each BPL 415, without departing from the scope of the present disclosure.

In a third example, illustrated by FIG. 4C, the UE 115 may report one or more measurements 410 to the base station 105 (e.g., RSRP, RSRQ, SINR). For example, the report may include an indication of each measured BPL 415 (e.g., indicating respective indices for a transmit beam and a receive beam), or a subset of the measured BPLs 415 (e.g., a best K BPLs), as well as an indication of each measured subband 405 (e.g., or a subset thereof, such as a best L subbands). The report may further include a measurement 410 corresponding to each reported BPL 415 and subband 405. For example, the UE 115 may report a respective measurement 410 for a first BPL (e.g., a transmit beam 1 and receive beam 3), a second BPL (e.g., a transmit beam 2 and a receive beam 4), a third BPL (e.g., a transmit beam 1 and a receive beam 1), and a fourth BPL (e.g., a transmit beam 3 and a receive beam 6), in one or more respective subbands 405 (e.g., any combination of subbands 1, 2 and 6).

In some cases, a report of the measurements 410 may include a differential representation of one or more measurements 410, for example, based on one or more base measurements 410. In a first example, each subband 405 may be associated with one base measurement 410 (e.g., for one BPL 415), and all other reported values for the subband 405 (e.g., for all other reported BPLs 415) may include a difference between a respective measurement 410 and the base measurement 410. In a second example, each BPL 415 may be associated with one base measurement 410 (e.g., for one subband 405), and all other reported values for the BPL 415 (e.g., for all other reported subbands 405) may include a difference between a respective measurement 410 and the base measurement 410. In a third example, each report to the base station 105 may be associated with one base measurement (e.g., for one combination of subband 405 and BPL 415), and other reported values (e.g., for all other reported BPLs 415 and subbands 405) may include a difference between a respective measurement 410 and the base measurement 410.

The UE 115 may perform reporting based on a periodicity that may, for example, be configured by the base station 105 for the subband-based measurement and reporting. The periodicity may indicate a periodic, semi-persistent, or aperiodic measurement configuration, among other examples. A reporting periodicity may, for example, be the same as or different from a measuring periodicity. Based on the determined information as illustrated by one of FIGS. 3A, 3B, 3C, or any combination thereof, the UE 115 may transmit a report of a signal quality of two or more BPLs 415, over one or more subbands 405, to the base station 105.

Figure 5:
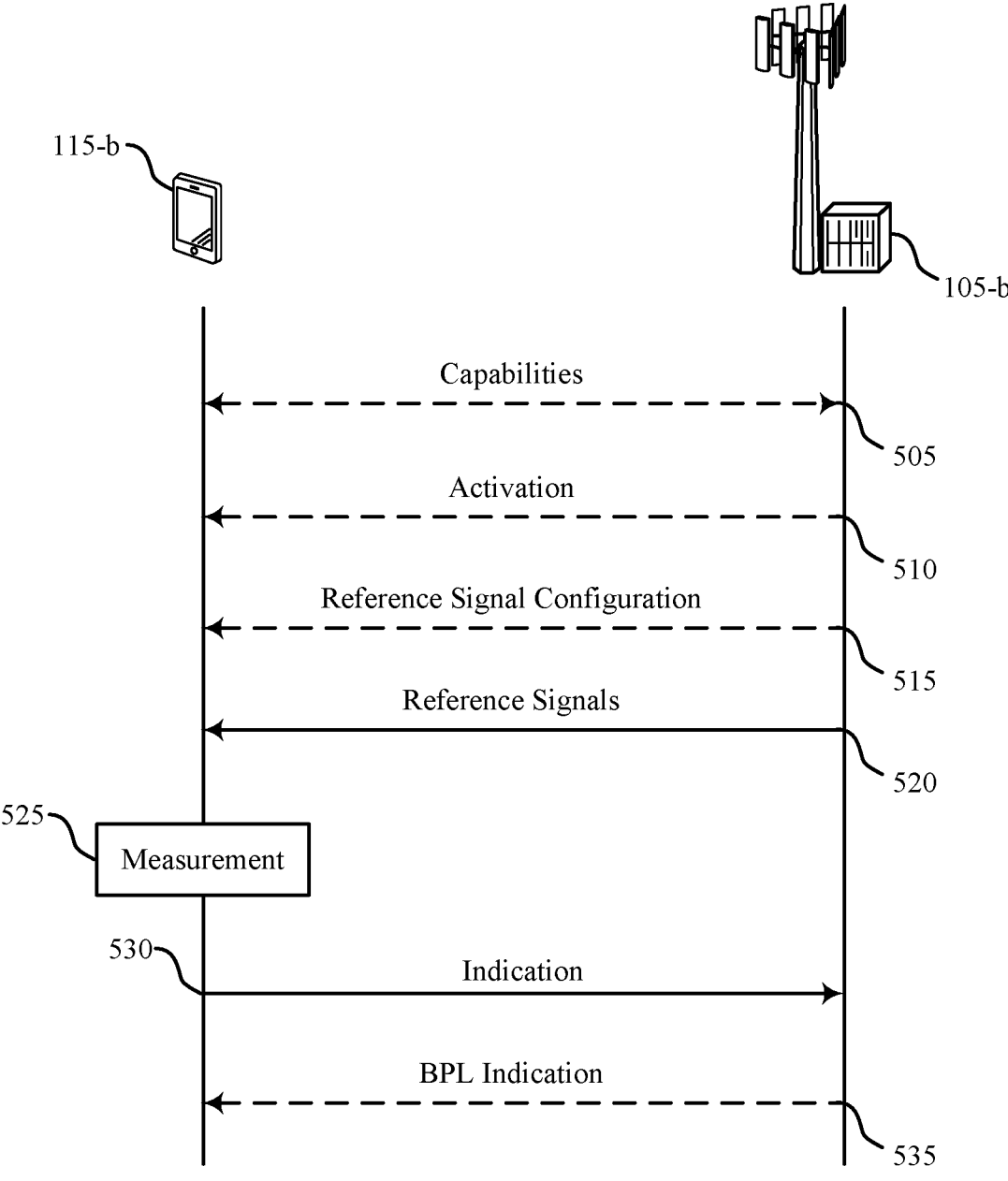
FIG. 5 illustrates an example of a process flow that supports subband-based reporting for concurrent BPLs in accordance with aspects of the present disclosure.

FIG. 5 illustrates an example of a process flow 500 that supports subband-based reporting for concurrent BPLs in accordance with aspects of the present disclosure. In some examples, process flow 500 may implement or be implemented by some aspects of wireless communications system 100 or 200, as well as measurement scheme 300 and reporting scheme 400. For example, process flow 500 may be implemented by a base station 105-*b* and UE 115-*b*, which may represent respective examples of a base station 105 and UEs 115 described with reference to FIGS. 1-4. As described herein, UE 115-*b* may perform BPL measurement and reporting on a subband-basis.

In the following description of process flow 500, the operations may be performed in a different order than the order shown, or the operations performed by UE 115-*b* and base station 105-*b* may be performed in different orders or at different times. For example, specific operations may also be left out of process flow 500, or other operations may be added to process flow 500. As another example, operations shown as performed in a single instance (e.g., a single transmission) may instead be performed as multiple instances (e.g., multiple transmission) over some duration of time. Although UE 115-*b* and base station 105-*b* are shown performing the operations of process flow 500, some aspects of some operations may also be performed by one or more other wireless devices.

At 505, in some cases, UE 115-*b* and base station 105-*b* may exchange one or more signals to communicate their multi-panel and/or multi-beam capabilities, for example, as described with reference to FIG. 3. In some cases, as described with reference to FIG. 3, the coordination signaling may include or may be associated with determining one or more BPL and panel combinations to use for subband-based BPL measurement and reporting.

At 510, in some cases, base station 105-*b* may transmit, to UE 115-*b*, an indication of activation of measurement and reporting at a subband basis (e.g., a per-subband basis). The activation indication may be communicated using one or more of RRC messages, a MAC CE, a DCI, or a UCI. In some cases, the activation indication may indicate for UE 115-*b* to report a best K BPLs (e.g., transmit and receive beam combinations) for one or more selected subbands, where the best K BPLs may be associated with a highest signal quality out of any measured BPLs.

Base station 105-*b* may further configure a periodicity for measuring and/or a periodicity for reporting subband-based BPL signal quality (e.g., via the activation indication or other signaling), for example, as described with reference to FIGS. 3 and 4. In some cases, the activation indication or other signaling may include an indication of one or more subbands for measurement and reporting. In some cases, UE 115-*b* may determine one or more subbands for measurement and reporting (e.g., select the one or more subbands from a group of subbands, such as a group indicated by base station 105-*b*).

At 515, in some cases, base station 105-*b* may transmit, to UE 115-*b*, a configuration indicating resources for multiple wideband reference signals, each wideband reference signal associated with one or more BPLs. In some cases, the configuration may also indicate an order of the resources over time, or a pattern of the resources over time, such that the resources may repeat in time. UE 115-*b* may use the repeating resources to conduct measurements at a subband level or at a BPL level (e.g., receive beam level), for example, as described herein with reference to FIG. 3. For example, UE 115-*b* may measure a first set of reference signals corresponding to BPLs for a first subband at a first time, and may measure a second set of reference signals corresponding to BPLs for a second subband at a second time. Additionally or alternatively, UE 115-*b* may measure a reference signal corresponding to a first BPL over multiple subbands at a first time, and may measure a second BPL over multiple subbands at a second time.

At 520, base station 105-*b* may transmit, to UE 115-*b*, the multiple wideband reference signals each spanning a first frequency range that includes multiple subbands. Each of the wideband reference signals may be associated with at least one BPL, and may be transmitted by base station 105-*b* concurrently with at least one other wideband reference signal (e.g., associated with another BPL), for example, for joint-BPL reception by UE 115-*b*.

At 525, UE 115-*b* may measure, for a subband within the first frequency range, signal quality for a set of BPLs based on two or more of the wideband reference signals as concurrently received. Each BPL of the set of BPLs may include a transmit beam for base station 105-*b* and a receive beam for UE 115-*b*, as described herein. For example, as described with reference to FIG. 3, UE 115-*b* may measure the signal quality for each of the set of BPLs on a subband-basis, over one or more subbands.

At 530, UE 115-*b* may transmit, to base station 105-*b* and based on the measuring of signal quality for the set of BPLs, an indication of signal quality for the subband that indicates two or more BPLs of the set of BPLs. For example, the indication of signal quality may be specific to the subband (e.g., may not indicate signal quality for any other subband) For example, as described with reference to FIG. 4, UE 115-*b* may report a set of subbands and one or more BPLs for each subband, may report a set of BPLs and one or more subbands for each BPL, or may report a measurement for one or more BPL and subband combinations.

At 535, in some cases, base station 105-*b* may transmit, to UE 115-*b*, an indication of one or more pairs of BPLs within the set of BPLs to use for communications with base station 105-*b*. The indication of the one or more pairs of BPLs may be based on the indication of signal quality received from UE 115-*b* and may include one or more QCL properties for each of the pairs of BPLs, for example, as described with reference to FIG. 2.

FIG. 6 shows a block diagram 600 of a device 605 that supports subband-based reporting for concurrent BPLs in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to subband-based reporting for concurrent BPLs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to subband-based reporting for concurrent BPLs). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of subband-based reporting for concurrent BPLs as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station, a set of multiple wideband reference signals each spanning a frequency range that includes a set of multiple subbands, where each of the set of multiple wideband reference signals is received concurrently with at least one other of the set of multiple wideband reference signals. The communications manager 620 may be configured as or otherwise support a means for measuring, for a subband within the frequency range, signal quality for a set of BPLs based at least in part on two or more of the set of multiple wideband reference signals as concurrently received, where the measured signal quality is specific to the subband, and where each BPL of the set of BPLs includes a transmit beam for the base station and a receive beam for the UE. The communications manager 620 may be configured as or otherwise support a means for transmitting, to the base station and based on the measured signal quality for the set of BPLs, an indication of signal quality that is specific to the subband and indicates a group of two or more BPLs of the set of BPLs.

The actions performed by the communications manager 620, among other examples herein, may be implemented to realize one or more potential advantages. For example, communications manager 620 may increase available battery power and communication quality at a wireless device (e.g., a UE 115) by supporting measuring and reporting BPLs on a subband-basis. The increase in communication quality may result in increased link performance and decreased overhead based on using a subband-based BPL for communications with a base station. Accordingly, communications manager 620 may save power and increase battery life at a wireless device (e.g., a UE 115) by strategically increasing a quality of communications at a wireless device (e.g., a UE 115).

FIG. 7 shows a block diagram 700 of a device 705 that supports subband-based reporting for concurrent BPLs in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to subband-based reporting for concurrent BPLs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to subband-based reporting for concurrent BPLs). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of subband-based reporting for concurrent BPLs as described herein. For example, the communications manager 720 may include a reference signal reception component 725, a reference signal measurement component 730, a BPL reporting component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The reference signal reception component 725 may be configured as or otherwise support a means for receiving, from a base station, a set of multiple wideband reference signals each spanning a frequency range that includes a set of multiple subbands, where each of the set of multiple wideband reference signals is received concurrently with at least one other of the set of multiple wideband reference signals. The reference signal measurement component 730 may be configured as or otherwise support a means for measuring, for a subband within the frequency range, signal quality for a set of BPLs based on two or more of the set of multiple wideband reference signals as concurrently received, where the measured signal quality is specific to the subband, and where each BPL of the set of BPLs includes a transmit beam for the base station and a receive beam for the UE. The BPL reporting component 735 may be configured as or otherwise support a means for transmitting, to the base station and based on the measured signal quality for the set of BPLs, an indication of signal quality that is specific to the subband and indicates a group of two or more BPLs of the set of BPLs.

A processor of a wireless device (e.g., controlling the receiver 710, the transmitter 715, or the transceiver 915 as described with reference to FIG. 9) may increase available battery power and communication quality. The increased communication quality may increase available battery power and throughput (e.g., via implementation of system components described with reference to FIG. 8) compared to other systems and techniques, for example, that do not support measuring and reporting BPLs on a subband-basis. Further, the processor of the wireless device may identify one or more aspects of the subband-based BPL measurement and reporting, which may result in increased communication quality, as well as save power and increase battery life at the wireless device (e.g., by strategically supporting subband-based BPL communications), among other benefits.

FIG. 8 shows a block diagram 800 of a communications manager 820 that supports subband-based reporting for concurrent BPLs in accordance with aspects of the present disclosure. The communications manager 820 may be an example of aspects of a communications manager 620, a communications manager 720, or both, as described herein. The communications manager 820, or various components thereof, may be an example of means for performing various aspects of subband-based reporting for concurrent BPLs as described herein. For example, the communications manager 820 may include a reference signal reception component 825, a reference signal measurement component 830, a BPL reporting component 835, a BPL configuration component 840, a BPL communication component 845, or any combination thereof. Each of these components may communicate, directly or indirectly, with one another (e.g., via one or more buses).

The communications manager 820 may support wireless communication at a UE in accordance with examples as disclosed herein. The reference signal reception component 825 may be configured as or otherwise support a means for receiving, from a base station, a set of multiple wideband reference signals each spanning a frequency range that includes a set of multiple subbands, where each of the set of multiple wideband reference signals is received concurrently with at least one other of the set of multiple wideband reference signals. The reference signal measurement component 830 may be configured as or otherwise support a means for measuring, for a subband within the frequency range, signal quality for a set of BPLs based on two or more of the set of multiple wideband reference signals as concurrently received, where the measured signal quality is specific to the subband, and where each BPL of the set of BPLs includes a transmit beam for the base station and a receive beam for the UE. The BPL reporting component 835 may be configured as or otherwise support a means for transmitting, to the base station and based on the measured signal quality for the set of BPLs, an indication of signal quality that is specific to the subband and indicates a group of two or more BPLs of the set of BPLs.

In some examples, the BPL configuration component 840 may be configured as or otherwise support a means for receiving an indication to report signal quality on a per-subband basis for the set of BPLs, where transmitting the indication of signal quality that is specific to the subband is based on receiving the indication to report signal quality on the per-subband basis. In some examples, to support receiving the indication to report signal quality on the per-subband basis, the BPL configuration component 840 may be configured as or otherwise support a means for receiving an indication of a quantity of BPLs to indicate via the indication of signal quality that is specific to the subband, where each of the BPLs indicated by the indication of signal quality has higher signal quality than each of the other BPLs of the set of BPLs.

In some examples, to support receiving the indication to report signal quality on the per-subband basis, the BPL configuration component 840 may be configured as or otherwise support a means for receiving an indication of a periodicity associated with transmitting the indication of signal quality, a periodicity associated with measuring signal quality for the set of BPLs, or both. In some examples, the BPL configuration component 840 may be configured as or otherwise support a means for receiving an indication of one or more subbands within the frequency range for reporting signal quality, where measuring the signal quantity and transmitting the indication of signal quality that is specific to the subband are based on the subband being included in the indicated one or more subbands. In some examples, the BPL configuration component 840 may be configured as or otherwise support a means for determining one or more subbands within the frequency range for reporting signal quality, where measuring the signal quantity and transmitting the indication of signal quality that is specific to the subband are based on the subband being included in the determined one or more subbands.

In some examples, the reference signal measurement component 830 may be configured as or otherwise support a means for measuring, for a second subband within the frequency range, a second signal quality for the set of BPLs based on two or more of the set of multiple wideband reference signals as concurrently received, where the second signal quality is specific to the second subband. In some examples, the BPL reporting component 835 may be configured as or otherwise support a means for transmitting, to the base station and based on the measuring of the second signal quality for the set of BPLs, a second indication of signal quality that is specific to the second subband and indicates a second group of two or more BPLs of the set of BPLs.

In some examples, to support transmitting the indication of signal quality, the BPL reporting component 835 may be configured as or otherwise support a means for transmitting an indication of a set of candidate subbands within the frequency range for communications with the base station, the set of candidate subbands including the subband. In some examples, to support transmitting the indication of signal quality, the BPL reporting component 835 may be configured as or otherwise support a means for transmitting, for each subband of the set of candidate subbands, an indication of a respective group of two or more candidate BPLs for communications with the base station via the subband.

In some examples, to support transmitting the indication of signal quality, the BPL reporting component 835 may be configured as or otherwise support a means for transmitting an indication of a set of candidate BPLs for communications with the base station, the set of candidate BPLs including the group of two or more BPLs. In some examples, to support transmitting the indication of signal quality, the BPL reporting component 835 may be configured as or otherwise support a means for transmitting, for each candidate BPL of the set of candidate BPLs, an indication of a respective set of one or more candidate subbands for communications with the base station via the candidate BPL.

In some examples, to support transmitting the indication of signal quality, the BPL reporting component 835 may be configured as or otherwise support a means for transmitting a respective indication of one or more signal quality measurements for each of a set of multiple BPLs, where each indication of one or more signal quality measurements is associated with a respective combination of a BPL within the set of BPLs and a respective subband within the frequency range. In some examples, the indication of signal quality includes a first signal quality measurement and one or more other signal quality measurements each indicating a respective difference relative to the first signal quality measurement.

In some examples, the BPL communication component 845 may be configured as or otherwise support a means for receiving, based on transmitting the indication of signal quality, an indication of one or more pairs of BPLs within the set of BPLs to use for communications with the base station, the indication of the one or more pairs of BPLs including one or more QCL properties for each of the pairs of BPLs. In some examples, the BPL communication component 845 may be configured as or otherwise support a means for communicating with the base station via the one or more pairs of BPLs.

In some examples, the reference signal reception component 825 may be configured as or otherwise support a means for receiving an indication of a repetition of the set of multiple wideband reference signals. In some examples, the reference signal measurement component 830 may be configured as or otherwise support a means for measuring, for a second subband within the frequency range at a second time based on the repetition, a second signal quality for the set of BPLs based on two or more of the set of multiple wideband reference signals as concurrently received, where the measuring of the signal quality that is specific to the subband occurs at a first time.

In some examples, the reference signal reception component 825 may be configured as or otherwise support a means for receiving an indication of a repetition of the set of multiple wideband reference signals. In some examples, the reference signal measurement component 830 may be configured as or otherwise support a means for measuring, at a second time based on the repetition, a second signal quality for a second set of BPLs that is specific to the subband and based on two or more of the set of multiple wideband reference signals as concurrently received, where the measuring of the signal quality that is specific to the set of BPLs occurs at a first time. In some examples, the reference signal reception component 825 may be configured as or otherwise support a means for transmitting an indication of a multi-panel capability of the UE, a multi-beam capability of the UE, or both, where receiving the set of multiple wideband reference signals is based on transmitting the indication.

FIG. 9 shows a diagram of a system 900 including a device 905 that supports subband-based reporting for concurrent BPLs in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting subband-based reporting for concurrent BPLs). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station, a set of multiple wideband reference signals each spanning a frequency range that includes a set of multiple subbands, where each of the set of multiple wideband reference signals is received concurrently with at least one other of the set of multiple wideband reference signals. The communications manager 920 may be configured as or otherwise support a means for measuring, for a subband within the frequency range, signal quality for a set of BPLs based at least in part on two or more of the set of multiple wideband reference signals as concurrently received, where the measured signal quality is specific to the subband, and where each BPL of the set of BPLs includes a transmit beam for the base station and a receive beam for the UE. The communications manager 920 may be configured as or otherwise support a means for transmitting, to the base station and based on the measured signal quality for the set of BPLs, an indication of signal quality that is specific to the subband and indicates a group of two or more BPLs of the set of BPLs.

In some examples, the communications manager 920 may be configured to perform various operations (e.g., receiving, monitoring, transmitting) using or otherwise in cooperation with the transceiver 915, the one or more antennas 925, or any combination thereof (e.g., the communications manager 920 may be configured to transmit or receive signals or messages described herein via the transceiver 915). Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of subband-based reporting for concurrent BPLs as described herein, or the processor 940 and the memory 930 may be otherwise configured to perform or support such operations.

FIG. 10 shows a block diagram 1000 of a device 1005 that supports subband-based reporting for concurrent BPLs in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to subband-based reporting for concurrent BPLs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to subband-based reporting for concurrent BPLs). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of subband-based reporting for concurrent BPLs as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a UE, a set of multiple wideband reference signals each spanning a frequency range that includes a set of multiple subbands, where each of the set of multiple wideband reference signals is transmitted concurrently with at least one other of the set of multiple wideband reference signals. The communications manager 1020 may be configured as or otherwise support a means for receiving, from the UE and based on two or more of the set of multiple wideband reference signals as concurrently transmitted, an indication of signal quality that is specific to a subband within the frequency range and indicates a group of two or more BPLs of a set of BPLs, where each BPL of the set of BPLs includes a transmit beam for the base station and a receive beam for the UE.

FIG. 11 shows a block diagram 1100 of a device 1105 that supports subband-based reporting for concurrent BPLs in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to subband-based reporting for concurrent BPLs). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to subband-based reporting for concurrent BPLs). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of subband-based reporting for concurrent BPLs as described herein. For example, the communications manager 1120 may include a reference signal transmission component 1125, a BPL report reception component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The reference signal transmission component 1125 may be configured as or otherwise support a means for transmitting, to a UE, a set of multiple wideband reference signals each spanning a frequency range that includes a set of multiple subbands, where each of the set of multiple wideband reference signals is transmitted concurrently with at least one other of the set of multiple wideband reference signals. The BPL report reception component 1130 may be configured as or otherwise support a means for receiving, from the UE and based on two or more of the set of multiple wideband reference signals as concurrently transmitted, an indication of signal quality that is specific to a subband within the frequency range and indicates a group of two or more BPLs of a set of BPLs, where each BPL of the set of BPLs includes a transmit beam for the base station and a receive beam for the UE.

FIG. 12 shows a block diagram 1200 of a communications manager 1220 that supports subband-based reporting for concurrent BPLs in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of subband-based reporting for concurrent BPLs as described herein. For example, the communications manager 1220 may include a reference signal transmission component 1225, a BPL report reception component 1230, a BPL configuration component 1235, a BPL communication component 1240, or any combination thereof. Each of these components may communicate, directly or indirectly, with one another (e.g., via one or more buses).

The communications manager 1220 may support wireless communication at a base station in accordance with examples as disclosed herein. The reference signal transmission component 1225 may be configured as or otherwise support a means for transmitting, to a UE, a set of multiple wideband reference signals each spanning a frequency range that includes a set of multiple subbands, where each of the set of multiple wideband reference signals is transmitted concurrently with at least one other of the set of multiple wideband reference signals. The BPL report reception component 1230 may be configured as or otherwise support a means for receiving, from the UE and based on two or more of the set of multiple wideband reference signals as concurrently transmitted, an indication of signal quality that is specific to a subband within the frequency range and indicates a group of two or more BPLs of a set of BPLs, where each BPL of the set of BPLs includes a transmit beam for the base station and a receive beam for the UE.

In some examples, the BPL configuration component 1235 may be configured as or otherwise support a means for transmitting, to the UE, an indication to report signal quality on a per-subband basis for the set of BPLs, where receiving the indication of signal quality that is specific to the subband is based on transmitting the indication to report signal quality on the per-subband basis. In some examples, to support transmitting the indication to report signal quality on the per-subband basis, the BPL configuration component 1235 may be configured as or otherwise support a means for transmitting an indication of a quantity of BPLs for the UE to indicate via the indication of signal quality that is specific to the subband, where each of the BPLs indicated by the indication of signal quality has higher signal quality than each of the other BPLs of the set of BPLs.

In some examples, to support transmitting the indication to report signal quality on the per-subband basis, the BPL configuration component 1235 may be configured as or otherwise support a means for transmitting an indication of a periodicity associated with the UE transmitting the indication of signal quality, a periodicity associated with the UE measuring signal quality for the set of BPLs, or both. In some examples, the BPL configuration component 1235 may be configured as or otherwise support a means for transmitting an indication of one or more subbands within the first frequency range for signal quality reporting by the UE, where receiving the indication of signal quality that is specific to the subband is based on the subband being included in the indicated one or more subbands. In some examples, the BPL configuration component 1235 may be configured as or otherwise support a means for transmitting an indication of an allocation of one or more subbands of the first frequency range for communications between the UE and the base station, where receiving the indication of signal quality that is specific to the subband is based on the subband being included in the allocated one or more subbands.

In some examples, the BPL report reception component 1230 may be configured as or otherwise support a means for receiving, from the UE and based on two or more of the set of multiple wideband reference signals as concurrently transmitted, a second indication of signal quality that is specific to a second subband within the frequency range and indicates a second group of two or more BPLs of the set of BPLs. In some examples, to support receiving the indication of signal quality, the BPL report reception component 1230 may be configured as or otherwise support a means for receiving an indication of a set of candidate subbands within the frequency range for communications with the UE, the set of candidate subbands including the subband. In some examples, to support receiving the indication of signal quality, the BPL report reception component 1230 may be configured as or otherwise support a means for receiving, for each subband of the set of candidate subbands, an indication of a respective group of two or more candidate BPLs for communications with the UE via the subband.

In some examples, to support receiving the indication of signal quality, the BPL report reception component 1230 may be configured as or otherwise support a means for receiving an indication of a set of candidate BPLs for communications with the UE, the set of candidate BPLs including the group of two or more BPLs. In some examples, to support receiving the indication of signal quality, the BPL report reception component 1230 may be configured as or otherwise support a means for receiving, for each candidate BPL of the set of candidate BPLs, an indication of a respective set of one or more candidate subbands for communications with the UE via the candidate BPL.

In some examples, to support receiving the indication of signal quality, the BPL report reception component 1230 may be configured as or otherwise support a means for receiving a respective indication of one or more signal quality measurements for each of a set of multiple BPLs, where each indication of one or more signal quality measurements is associated with a respective combination of a BPL within the set of BPLs and a respective subband within the frequency range. In some examples, the indication of signal quality includes a first signal quality measurement and one or more other signal quality measurements each indicating a respective difference relative to the first signal quality measurement.

In some examples, the BPL communication component 1240 may be configured as or otherwise support a means for transmitting, based on the indication of signal quality, an indication of one or more pairs of BPLs within the set of BPLs for communications with the UE, the indication of the one or more pairs of BPLs including one or more QCL properties for each of the pairs of BPLs. In some examples, the BPL communication component 1240 may be configured as or otherwise support a means for communicating with the UE via the one or more pairs of BPLs.

In some examples, the reference signal transmission component 1225 may be configured as or otherwise support a means for transmitting an indication of a repetition of the set of multiple wideband reference signals, where transmitting the set of multiple wideband reference signals is in accordance with the repetition.

FIG. 13 shows a diagram of a system 1300 including a device 1305 that supports subband-based reporting for concurrent BPLs in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting subband-based reporting for concurrent BPLs). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, a set of multiple wideband reference signals each spanning a frequency range that includes a set of multiple subbands, where each of the set of multiple wideband reference signals is transmitted concurrently with at least one other of the set of multiple wideband reference signals. The communications manager 1320 may be configured as or otherwise support a means for receiving, from the UE and based on two or more of the set of multiple wideband reference signals as concurrently transmitted, an indication of signal quality that is specific to a subband within the frequency range and indicates a group of two or more BPLs of a set of BPLs, where each BPL of the set of BPLs includes a transmit beam for the base station and a receive beam for the UE.

In some examples, the communications manager 1320 may be configured to perform various operations (e.g., receiving, monitoring, transmitting) using or otherwise in cooperation with the transceiver 1315, the one or more antennas 1325, or any combination thereof (e.g., the communications manager 1320 may be configured to transmit or receive signals or messages described herein via the transceiver 1315). Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of subband-based reporting for concurrent BPLs as described herein, or the processor 1340 and the memory 1330 may be otherwise configured to perform or support such operations.

FIG. 14 shows a flowchart illustrating a method 1400 that supports subband-based reporting for concurrent BPLs in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a set of multiple wideband reference signals each spanning a frequency range that includes a set of multiple subbands, where each of the set of multiple wideband reference signals is received concurrently with at least one other of the set of multiple wideband reference signals. The operations of 1405 may be performed in accordance with examples as disclosed herein. In some examples, aspects of the operations of 1405 may be performed by a reference signal reception component 825 as described with reference to FIG. 8. Additionally, or alternatively, means for performing 1405 may, but not necessarily, include, for example, antenna 925, transceiver 915, communications manager 920, memory 930 (including code 935), processor 940 and/or bus 945.

At 1410, the method may include measuring, for a subband within the frequency range, signal quality for a set of BPLs based on two or more of the set of multiple wideband reference signals as concurrently received, where the measured signal quality is specific to the subband, and where each BPL of the set of BPLs includes a transmit beam for the base station and a receive beam for the UE. The operations of 1410 may be performed in accordance with examples as disclosed herein. In some examples, aspects of the operations of 1410 may be performed by a reference signal measurement component 830 as described with reference to FIG. 8. Additionally, or alternatively, means for performing 1410 may, but not necessarily, include, for example, antenna 925, transceiver 915, communications manager 920, memory 930 (including code 935), processor 940 and/or bus 945.

At 1415, the method may include transmitting, to the base station and based on the measured signal quality for the set of BPLs, an indication of signal quality that is specific to the subband and indicates a group of two or more BPLs of the set of BPLs. The operations of 1415 may be performed in accordance with examples as disclosed herein. In some examples, aspects of the operations of 1415 may be performed by a BPL reporting component 835 as described with reference to FIG. 8. Additionally, or alternatively, means for performing 1415 may, but not necessarily, include, for example, antenna 925, transceiver 915, communications manager 920, memory 930 (including code 935), processor 940 and/or bus 945.

FIG. 15 shows a flowchart illustrating a method 1500 that supports subband-based reporting for concurrent BPLs in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a set of multiple wideband reference signals each spanning a frequency range that includes a set of multiple subbands, where each of the set of multiple wideband reference signals is received concurrently with at least one other of the set of multiple wideband reference signals. The operations of 1505 may be performed in accordance with examples as disclosed herein. In some examples, aspects of the operations of 1505 may be performed by a reference signal reception component 825 as described with reference to FIG. 8. Additionally, or alternatively, means for performing 1505 may, but not necessarily, include, for example, antenna 925, transceiver 915, communications manager 920, memory 930 (including code 935), processor 940 and/or bus 945.

At 1510, the method may include measuring, for a subband within the frequency range, signal quality for a set of BPLs based on two or more of the set of multiple wideband reference signals as concurrently received, where the measured signal quality is specific to the subband, and where each BPL of the set of BPLs includes a transmit beam for the base station and a receive beam for the UE. The operations of 1510 may be performed in accordance with examples as disclosed herein. In some examples, aspects of the operations of 1510 may be performed by a reference signal measurement component 830 as described with reference to FIG. 8. Additionally, or alternatively, means for performing 1510 may, but not necessarily, include, for example, antenna 925, transceiver 915, communications manager 920, memory 930 (including code 935), processor 940 and/or bus 945.

At 1515, the method may include transmitting, to the base station and based on the measured signal quality for the set of BPLs, an indication of signal quality that is specific to the subband and indicates a group of two or more BPLs of the set of BPLs. The operations of 1515 may be performed in accordance with examples as disclosed herein. In some examples, aspects of the operations of 1515 may be performed by a BPL reporting component 835 as described with reference to FIG. 8. Additionally, or alternatively, means for performing 1515 may, but not necessarily, include, for example, antenna 925, transceiver 915, communications manager 920, memory 930 (including code 935), processor 940 and/or bus 945.

At 1520, the method may include receiving, based on transmitting the indication of signal quality, an indication of one or more pairs of BPLs within the set of BPLs to use for communications with the base station, the indication of the one or more pairs of BPLs including one or more QCL properties for each of the pairs of BPLs. The operations of 1520 may be performed in accordance with examples as disclosed herein. In some examples, aspects of the operations of 1520 may be performed by a BPL communication component 845 as described with reference to FIG. 8. Additionally, or alternatively, means for performing 1520 may, but not necessarily, include, for example, antenna 925, transceiver 915, communications manager 920, memory 930 (including code 935), processor 940 and/or bus 945.

At 1525, the method may include communicating with the base station via the one or more pairs of BPLs. The operations of 1525 may be performed in accordance with examples as disclosed herein. In some examples, aspects of the operations of 1525 may be performed by a BPL communication component 845 as described with reference to FIG. 8. Additionally, or alternatively, means for performing 1525 may, but not necessarily, include, for example, antenna 925, transceiver 915, communications manager 920, memory 930 (including code 935), processor 940 and/or bus 945.

FIG. 16 shows a flowchart illustrating a method 1600 that supports subband-based reporting for concurrent BPLs in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a set of multiple wideband reference signals each spanning a frequency range that includes a set of multiple subbands, where each of the set of multiple wideband reference signals is transmitted concurrently with at least one other of the set of multiple wideband reference signals. The operations of 1605 may be performed in accordance with examples as disclosed herein. In some examples, aspects of the operations of 1605 may be performed by a reference signal transmission component 1225 as described with reference to FIG. 12. Additionally, or alternatively, means for performing 1605 may, but not necessarily, include, for example, antenna 1325, transceiver 1315, communications manager 1320, memory 1330 (including code 1335), processor 1340 and/or bus 1345.

At 1610, the method may include receiving, from the UE and based on two or more of the set of multiple wideband reference signals as concurrently transmitted, an indication of signal quality that is specific to a subband within the frequency range and indicates a group of two or more BPLs of a set of BPLs, where each BPL of the set of BPLs includes a transmit beam for the base station and a receive beam for the UE. The operations of 1610 may be performed in accordance with examples as disclosed herein. In some examples, aspects of the operations of 1610 may be performed by a BPL report reception component 1230 as described with reference to FIG. 12. Additionally, or alternatively, means for performing 1610 may, but not necessarily, include, for example, antenna 1325, transceiver 1315, communications manager 1320, memory 1330 (including code 1335), processor 1340 and/or bus 1345.

FIG. 17 shows a flowchart illustrating a method 1700 that supports subband-based reporting for concurrent BPLs in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a set of multiple wideband reference signals each spanning a frequency range that includes a set of multiple subbands, where each of the set of multiple wideband reference signals is transmitted concurrently with at least one other of the set of multiple wideband reference signals. The operations of 1705 may be performed in accordance with examples as disclosed herein. In some examples, aspects of the operations of 1705 may be performed by a reference signal transmission component 1225 as described with reference to FIG. 12. Additionally, or alternatively, means for performing 1705 may, but not necessarily, include, for example, antenna 1325, transceiver 1315, communications manager 1320, memory 1330 (including code 1335), processor 1340 and/or bus 1345.

At 1710, the method may include receiving, from the UE and based on two or more of the set of multiple wideband reference signals as concurrently transmitted, an indication of signal quality that is specific to a subband within the frequency range and indicates a group of two or more BPLs of a set of BPLs, where each BPL of the set of BPLs includes a transmit beam for the base station and a receive beam for the UE. The operations of 1710 may be performed in accordance with examples as disclosed herein. In some examples, aspects of the operations of 1710 may be performed by a BPL report reception component 1230 as described with reference to FIG. 12. Additionally, or alternatively, means for performing 1710 may, but not necessarily, include, for example, antenna 1325, transceiver 1315, communications manager 1320, memory 1330 (including code 1335), processor 1340 and/or bus 1345.

At 1715, the method may include transmitting, based on the indication of signal quality, an indication of one or more pairs of BPLs within the set of BPLs for communications with the UE, the indication of the one or more pairs of BPLs including one or more QCL properties for each of the pairs of BPLs. The operations of 1715 may be performed in accordance with examples as disclosed herein. In some examples, aspects of the operations of 1715 may be performed by a BPL communication component 1240 as described with reference to FIG. 12. Additionally, or alternatively, means for performing 1715 may, but not necessarily, include, for example, antenna 1325, transceiver 1315, communications manager 1320, memory 1330 (including code 1335), processor 1340 and/or bus 1345.

At 1720, the method may include communicating with the UE via the one or more pairs of BPLs. The operations of 1720 may be performed in accordance with examples as disclosed herein. In some examples, aspects of the operations of 1720 may be performed by a BPL communication component 1240 as described with reference to FIG. 12. Additionally, or alternatively, means for performing 1720 may, but not necessarily, include, for example, antenna 1325, transceiver 1315, communications manager 1320, memory 1330 (including code 1335), processor 1340 and/or bus 1345.

The following provides an overview of aspects of the present disclosure:

Aspect 1: A method for wireless communication at a UE, comprising: receiving, from a base station, a plurality of wideband reference signals each spanning a frequency range that comprises a plurality of subbands, wherein each of the plurality of wideband reference signals is received concurrently with at least one other of the plurality of wideband reference signals; measuring, for a subband within the frequency range, signal quality for a set of BPLs based at least in part on two or more of the plurality of wideband reference signals as concurrently received, wherein the measured signal quality is specific to the subband, and wherein each BPL of the set of BPLs comprises a transmit beam for the base station and a receive beam for the UE; and transmitting, to the base station and based at least in part on the measured signal quality for the set of BPLs, an indication of signal quality that is specific to the subband and indicates a group of two or more BPLs of the set of BPLs.

Aspect 2: The method of aspect 1, further comprising: receiving an indication to report signal quality on a per-subband basis for the set of BPLs, wherein transmitting the indication of signal quality that is specific to the subband is based at least in part on receiving the indication to report signal quality on the per-subband basis.

Aspect 3: The method of aspect 2, wherein receiving the indication to report signal quality on the per-subband basis comprises: receiving an indication of a quantity of BPLs to indicate via the indication of signal quality that is specific to the subband, wherein each of the BPLs indicated by the indication of signal quality has higher signal quality than each of the other BPLs of the set of BPLs.

Aspect 4: The method of any of aspects 2 through 3, wherein receiving the indication to report signal quality on the per-subband basis comprises: receiving an indication of a periodicity associated with transmitting the indication of signal quality, a periodicity associated with measuring signal quality for the set of BPLs, or both.

Aspect 5: The method of any of aspects 1 through 4, further comprising: receiving an indication of one or more subbands within the frequency range for reporting signal quality, wherein measuring the signal quantity and transmitting the indication of signal quality that is specific to the subband are based at least in part on the subband being included in the indicated one or more subbands.

Aspect 6: The method of any of aspects 1 through 4, further comprising: determining one or more subbands within the first frequency range for reporting signal quality, wherein measuring the signal quantity and transmitting the indication of signal quality that is specific to the subband are based at least in part on the subband being included in the determined one or more subbands.

Aspect 7: The method of any of aspects 1 through 6, further comprising: measuring, for a second subband within the frequency range, signal quality for the set of BPLs based at least in part on two or more of the plurality of wideband reference signals as concurrently received, wherein the second signal quality is specific to the second subband; and transmitting, to the base station and based at least in part on the measuring of the second signal quality for the set of BPLs, a second indication of signal quality that is specific to the second subband and indicates a second group of two or more BPLs of the set of BPLs.

Aspect 8: The method of any of aspects 1 through 7, wherein transmitting the indication of signal quality comprises: transmitting an indication of a set of candidate subbands within the frequency range for communications with the base station, the set of candidate subbands comprising the subband; and transmitting, for each subband of the set of candidate subbands, an indication of a respective group of two or more candidate BPLs for communications with the base station via the subband.

Aspect 9: The method of any of aspects 1 through 7, wherein transmitting the indication of signal quality comprises: transmitting an indication of a set of candidate BPLs for communications with the base station, the set of candidate BPLs comprising the group of two or more BPLs; and transmitting, for each candidate BPL of the set of candidate BPLs, an indication of a respective set of one or more candidate subbands for communications with the base station via the candidate BPL.

Aspect 10: The method of any of aspects 1 through 7, wherein transmitting the indication of signal quality comprises: transmitting a respective indication of one or more signal quality measurements for each of a plurality of BPLs, wherein each indication of one or more signal quality measurements is associated with a respective combination of a BPL within the set of BPLs and a respective subband within the frequency range.

Aspect 11: The method of aspect 10, wherein the indication of signal quality comprises a first signal quality measurement and one or more other signal quality measurements each indicating a respective difference relative to the first signal quality measurement.

Aspect 12: The method of any of aspects 1 through 11, further comprising: receiving, based at least in part on transmitting the indication of signal quality, an indication of one or more pairs of BPLs within the set of BPLs to use for communications with the base station, the indication of the one or more pairs of BPLs comprising one or more QCL properties for each of the pairs of BPLs; and communicating with the base station via the one or more pairs of BPLs.

Aspect 13: The method of any of aspects 1 through 12, further comprising: receiving an indication of a repetition of the plurality of wideband reference signals; and measuring, for a second subband within the frequency range at a second time based at least in part on the repetition, a second signal quality for the set of BPLs based at least in part on two or more of the plurality of wideband reference signals as concurrently received, wherein the measuring of the signal quality that is specific to the subband occurs at a first time.

Aspect 14: The method of any of aspects 1 through 13, further comprising: receiving an indication of a repetition of the plurality of wideband reference signals; measuring, at a second time based at least in part on the repetition, a second signal quality for a second set of BPLs that is specific to the subband and based at least in part on two or more of the plurality of wideband reference signals as concurrently received, wherein the measuring of the signal quality that is specific to the set of BPLs occurs at a first time.

Aspect 15: The method of any of aspects 1 through 14, further comprising: transmitting an indication of a multi-panel capability of the UE, a multi-beam capability of the UE, or both, wherein receiving the plurality of reference signals is based at least in part on transmitting the indication.

Aspect 16: A method for wireless communication at a base station, comprising: transmitting, to a UE, a plurality of wideband reference signals each spanning a frequency range that comprises a plurality of subbands, wherein each of the plurality of wideband reference signals is transmitted concurrently with at least one other of the plurality of wideband reference signals; and receiving, from the UE and based at least in part on two or more of the plurality of wideband reference signals as concurrently transmitted, an indication of signal quality that is specific to a subband within the frequency range and indicates a group of two or more BPLs of a set of BPLs, wherein each BPL of the set of BPLs comprises a transmit beam for the base station and a receive beam for the UE.

Aspect 17: The method of aspect 16, further comprising: transmitting, to the UE, an indication to report signal quality on a per-subband basis for the set of BPLs, wherein receiving the indication of signal quality that is specific to the subband is based at least in part on transmitting the indication to report signal quality on the per-subband basis.

Aspect 18: The method of aspect 17, wherein transmitting the indication to report signal quality on the per-subband basis comprises: transmitting an indication of a quantity of BPLs for the UE to indicate via the indication of signal quality that is specific to the subband, wherein each of the BPLs indicated by the indication of signal quality has higher signal quality than each of the other BPLs of the set of BPLs.

Aspect 19: The method of any of aspects 17 through 18, wherein transmitting the indication to report signal quality on the per-subband basis comprises: transmitting an indication of a periodicity associated with the UE transmitting the indication of signal quality, a periodicity associated with the UE measuring signal quality for the set of BPLs, or both.

Aspect 20: The method of any of aspects 16 through 19, further comprising: transmitting an indication of one or more subbands within the frequency range for signal quality reporting by the UE, wherein receiving the indication of signal quality that is specific to the subband is based at least in part on the subband being included in the indicated one or more subbands.

Aspect 21: The method of any of aspects 16 through 20, further comprising: transmitting an indication of an allocation of one or more subbands of the frequency range for communications between the UE and the base station, wherein receiving the indication of signal quality that is specific to the subband is based at least in part on the subband being included in the allocated one or more subbands.

Aspect 22: The method of any of aspects 16 through 21, further comprising: receiving, from the UE and based at least in part on two or more of the plurality of wideband reference signals as concurrently transmitted, a second indication of signal quality that is specific to a second subband within the frequency range and indicates a second group of two or more BPLs of the set of BPLs.

Aspect 23: The method of any of aspects 16 through 22, wherein receiving the indication of signal quality comprises: receiving an indication of a set of candidate subbands within the frequency range for communications with the UE, the set of candidate subbands comprising the subband; and receiving, for each subband of the set of candidate subbands, an indication of a respective group of two or more candidate BPLs for communications with the UE via the subband.

Aspect 24: The method of any of aspects 16 through 22, wherein receiving the indication of signal quality comprises:

receiving an indication of a set of candidate BPLs for communications with the UE, the set of candidate BPLs comprising the group of two or more BPLs; and receiving, for each candidate BPL of the set of candidate BPLs, an indication of a respective set of one or more candidate subbands for communications with the UE via the candidate BPL.

Aspect 25: The method of any of aspects 16 through 22, wherein receiving the indication of signal quality comprises: receiving a respective indication of one or more signal quality measurements for each of a plurality of BPLs, wherein each indication of one or more signal quality measurements is associated with a respective combination of a BPL within the set of BPLs and a respective subband within the frequency range.

Aspect 26: The method of aspect 25, wherein the indication of signal quality comprises a first signal quality measurement and one or more other signal quality measurements each indicating a respective difference relative to the first signal quality measurement.

Aspect 27: The method of any of aspects 16 through 26, further comprising: transmitting, based at least in part on the indication of signal quality, an indication of one or more pairs of BPLs within the set of BPLs for communications with the UE, the indication of the one or more pairs of BPLs comprising one or more QCL properties for each of the pairs of BPLs; and communicating with the UE via the one or more pairs of BPLs.

Aspect 28: The method of any of aspects 16 through 27, further comprising: transmitting an indication of a repetition of the plurality of wideband reference signals, wherein transmitting the plurality of wideband reference signals is in accordance with the repetition.

Aspect 29: An apparatus for wireless communication at a UE, comprising a processor, the processor coupled with a transceiver; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a base station, comprising a processor, the processor coupled with a transceiver; memory coupled with the processor; and instructions stored in the memory and executable by the processor to cause the apparatus to perform a method of any of aspects 16 through 28.

Aspect 33: An apparatus for wireless communication at a base station, comprising at least one means for performing a method of any of aspects 16 through 28.

Aspect 34: A non-transitory computer-readable medium storing code for wireless communication at a base station, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a base station, a plurality of wideband reference signals each spanning a frequency range that comprises a plurality of subbands, wherein each of the plurality of wideband reference signals is received concurrently with at least one other of the plurality of wideband reference signals;

measuring, for a subband within the frequency range, signal quality for a set of beam pair links based at least in part on two or more of the plurality of wideband reference signals as concurrently received, wherein the measured signal quality is specific to the subband, and wherein each beam pair link of the set of beam pair links comprises a transmit beam for the base station and a receive beam for the UE; and transmitting, to the base station and based at least in part on the measured signal quality for the set of beam pair links, an indication of signal quality that is specific to the subband and indicates a group of two or more beam pair links of the set of beam pair links.

2. The method of claim 1, further comprising:

receiving an indication to report signal quality on a per-subband basis for the set of beam pair links, wherein transmitting the indication of signal quality that is specific to the subband is based at least in part on receiving the indication to report signal quality on the per-subband basis.

3. The method of claim 2, wherein receiving the indication to report signal quality on the per-subband basis comprises:

receiving an indication of a quantity of beam pair links to indicate via the indication of signal quality that is specific to the subband, wherein each of the beam pair links indicated by the indication of signal quality has higher signal quality than each of the other beam pair links of the set of beam pair links.

4. The method of claim 2, wherein receiving the indication to report signal quality on the per-subband basis comprises:

receiving an indication of a periodicity associated with transmitting the indication of signal quality, a periodicity associated with measuring signal quality for the set of beam pair links, or both.

5. The method of claim 1, further comprising:

receiving an indication of one or more subbands within the frequency range for reporting signal quality, wherein measuring the signal quantity and transmitting the indication of signal quality that is specific to the subband are based at least in part on the subband being included in the indicated one or more subbands.

6. The method of claim 1, further comprising:

determining one or more subbands within the first frequency range for reporting signal quality, wherein measuring the signal quantity and transmitting the indication of signal quality that is specific to the subband are based at least in part on the subband being included in the determined one or more subbands.

7. The method of claim 1, further comprising:

measuring, for a second subband within the frequency range, a second signal quality for the set of beam pair links based at least in part on two or more of the plurality of wideband reference signals as concurrently received, wherein the second signal quality is specific to the second subband; and transmitting, to the base station and based at least in part on the measuring of the second signal quality for the set of beam pair links, a second indication of signal quality that is specific to the second subband and indicates a second group of two or more beam pair links of the set of beam pair links.

8. The method of claim 1, wherein transmitting the indication of signal quality comprises:

transmitting an indication of a set of candidate subbands within the frequency range for communications with the base station, the set of candidate subbands comprising the subband; and transmitting, for each subband of the set of candidate subbands, an indication of a respective group of two or more candidate beam pair links for communications with the base station via the subband.

9. The method of claim 1, wherein transmitting the indication of signal quality comprises:

transmitting an indication of a set of candidate beam pair links for communications with the base station, the set of candidate beam pair links comprising the group of two or more beam pair links; and transmitting, for each candidate beam pair link of the set of candidate beam pair links, an indication of a respective set of one or more candidate subbands for communications with the base station via the candidate beam pair link.

10. The method of claim 1, wherein transmitting the indication of signal quality comprises:

transmitting a respective indication of one or more signal quality measurements for each of a plurality of beam pair links, wherein each indication of one or more signal quality measurements is associated with a respective combination of a beam pair link within the set of beam pair links and a respective subband within the frequency range, and wherein the indication of signal quality comprises a first signal quality measurement and one or more other signal quality measurements each indicating a respective difference relative to the first signal quality measurement.

11. The method of claim 1, further comprising:

receiving, based at least in part on transmitting the indication of signal quality, an indication of one or more pairs of beam pair links within the set of beam pair links to use for communications with the base station, the indication of the one or more pairs of beam pair links comprising one or more quasi co-location properties for each of the pairs of beam pair links; and communicating with the base station via the one or more pairs of beam pair links.

12. The method of claim 1, further comprising:

receiving an indication of a repetition of the plurality of wideband reference signals; and measuring, for a second subband within the frequency range at a second time based at least in part on the repetition, a second signal quality for the set of beam pair links based at least in part on two or more of the plurality of wideband reference signals as concurrently received, wherein the measuring of the signal quality that is specific to the subband occurs at a first time.

13. The method of claim 1, further comprising:

receiving an indication of a repetition of the plurality of wideband reference signals;

measuring, at a second time based at least in part on the repetition, a second signal quality for a second set of beam pair links that is specific to the subband and based at least in part on two or more of the plurality of wideband reference signals as concurrently received, wherein the measuring of the signal quality that is specific to the set of beam pair links occurs at a first time.

14. A method for wireless communication at a base station, comprising:

transmitting, to a user equipment (UE), a plurality of wideband reference signals each spanning a frequency range that comprises a plurality of subbands, wherein each of the plurality of wideband reference signals is transmitted concurrently with at least one other of the plurality of wideband reference signals; and receiving, from the UE and based at least in part on two or more of the plurality of wideband reference signals as concurrently transmitted, an indication of signal quality that is specific to a subband within the frequency range and indicates a group of two or more beam pair links of a set of beam pair links, wherein each beam pair link of the set of beam pair links comprises a transmit beam for the base station and a receive beam for the UE.

15. The method of claim 14, further comprising:

transmitting, to the UE, an indication to report signal quality on a per-subband basis for the set of beam pair links, wherein:

receiving the indication of signal quality that is specific to the subband is based at least in part on transmitting the indication to report signal quality on the per-subband basis; and transmitting the indication to report signal quality on the per-subband basis comprises transmitting an indication of a quantity of beam pair links for the UE to indicate via the indication of signal quality that is specific to the subband, wherein each of the beam pair links indicated by the indication of signal quality has higher signal quality than each of the other beam pair links of the set of beam pair links.

16. The method of claim 14, further comprising:

transmitting, to the UE, an indication to report signal quality on a per-subband basis for the set of beam pair links, wherein:

receiving the indication of signal quality that is specific to the subband is based at least in part on transmitting the indication to report signal quality on the per-subband basis; and transmitting the indication to report signal quality on the per-subband basis comprises transmitting an indication of a periodicity associated with the UE transmitting the indication of signal quality, a periodicity associated with the UE measuring signal quality for the set of beam pair links, or both.

17. The method of claim 14, further comprising:

transmitting an indication of one or more subbands within the frequency range for signal quality reporting by the UE, wherein receiving the indication of signal quality that is specific to the subband is based at least in part on the subband being included in the indicated one or more subbands; or transmitting an indication of an allocation of one or more subbands of the frequency range for communications between the UE and the base station, wherein receiving the indication of signal quality that is specific to the subband is based at least in part on the subband being included in the allocated one or more subbands.

18. The method of claim 14, further comprising:

receiving, from the UE and based at least in part on two or more of the plurality of wideband reference signals as concurrently transmitted, a second indication of signal quality that is specific to a second subband within the frequency range and indicates a second group of two or more beam pair links of the set of beam pair links.

19. The method of claim 14, wherein receiving the indication of signal quality comprises:

receiving an indication of a set of candidate subbands within the frequency range for communications with the UE, the set of candidate subbands comprising the subband; and receiving, for each subband of the set of candidate subbands, an indication of a respective group of two or more candidate beam pair links for communications with the UE via the subband.

20. The method of claim 14, wherein receiving the indication of signal quality comprises:

receiving an indication of a set of candidate beam pair links for communications with the UE, the set of candidate beam pair links comprising the group of two or more beam pair links; and receiving, for each candidate beam pair link of the set of candidate beam pair links, an indication of a respective set of one or more candidate subbands for communications with the UE via the candidate beam pair link.

21. The method of claim 14, wherein:

receiving the indication of signal quality comprises receiving a respective indication of one or more signal quality measurements for each of a plurality of beam pair links, wherein each indication of one or more signal quality measurements is associated with a respective combination of a beam pair link within the set of beam pair links and a respective subband within the frequency range; and the indication of signal quality comprises a first signal quality measurement and one or more other signal quality measurements each indicating a respective difference relative to the first signal quality measurement.

22. The method of claim 14, further comprising:

transmitting, based at least in part on the indication of signal quality, an indication of one or more pairs of beam pair links within the set of beam pair links for communications with the UE, the indication of the one or more pairs of beam pair links comprising one or more quasi co-location properties for each of the pairs of beam pair links; and communicating with the UE via the one or more pairs of beam pair links.

23. An apparatus for wireless communication, comprising:

a processor of a user equipment (UE), the processor coupled with a transceiver;

memory coupled with the processor, the memory and the processor configured to:

receive, via the transceiver, from a base station, a plurality of wideband reference signals each spanning a frequency range that comprises a plurality of subbands, wherein each of the plurality of wideband reference signals is received concurrently with at least one other of the plurality of wideband reference signals;

measure, for a subband within the frequency range, signal quality for a set of beam pair links based at least in part on two or more of the plurality of wideband reference signals as concurrently received, wherein the measured signal quality is specific to the subband, and wherein each beam pair link of the set of beam pair links comprises a transmit beam for the base station and a receive beam for the UE; and transmit, via the transceiver, to the base station and based at least in part on the measured signal quality for the set of beam pair links, an indication of signal quality that is specific to the subband and indicates a group of two or more beam pair links of the set of beam pair links.

24. The apparatus of claim 23, the memory and the processor further configured to:

receive, via the transceiver, an indication to report signal quality on a per-subband basis for the set of beam pair links, wherein:

the memory and the processor are configured to transmit the indication of signal quality that is specific to the subband based at least in part on receiving the indication to report signal quality on the per-subband basis; and to receive the indication to report signal quality on the per-subband basis, the memory and the processor are configured to receive, via the transceiver, an indication of a quantity of beam pair links to indicate via the indication of signal quality that is specific to the subband, each of the beam pair links indicated by the indication of signal quality having higher signal quality than each of the other beam pair links of the set of beam pair links.

25. The apparatus of claim 23, the memory and the processor further configured to:

receive, via the transceiver, an indication to report signal quality on a per-subband basis for the set of beam pair links, wherein:

the memory and the processor are configured to transmit the indication of signal quality that is specific to the subband based at least in part on receiving the indication to report signal quality on the per-subband basis; and to receive the indication to report signal quality on the per-subband basis, the memory and the processor are configured to receive, via the transceiver, an indication of a periodicity associated with transmitting the indication of signal quality, a periodicity associated with measuring signal quality for the set of beam pair links, or both.

26. The apparatus of claim 23, the memory and the processor further configured to:

transmit, via the transceiver an indication of a set of candidate subbands within the frequency range for communications with the base station, the set of candidate subbands comprising the subband; and transmit, via the transceiver, for each subband of the set of candidate subbands, an indication of a respective group of two or more candidate beam pair links for communications with the base station via the subband.

27. The apparatus of claim 23, wherein, to transmit the indication of signal quality, the memory and the processor are configured to:

transmit, via the transceiver, an indication of a set of candidate beam pair links for communications with the base station, the set of candidate beam pair links comprising the group of two or more beam pair links; and transmit, via the transceiver, for each candidate beam pair link of the set of candidate beam pair links, an indication of a respective set of one or more candidate subbands for communications with the base station via the candidate beam pair link.

28. The apparatus of claim 23, wherein, to transmit the indication of signal quality, the memory and the processor are configured to:

transmit, via the transceiver, a respective indication of one or more signal quality measurements for each of a plurality of beam pair links, wherein each indication of one or more signal quality measurements is associated with a respective combination of a beam pair link within the set of beam pair links and a respective subband within the frequency range, and wherein the indication of signal quality comprises a first signal quality measurement and one or more other signal quality measurements each indicating a respective difference relative to the first signal quality measurement.

29. The apparatus of claim 23, the memory and the processor further configured to:

receive, via the transceiver, based at least in part on transmitting the indication of signal quality, an indication of one or more pairs of beam pair links within the set of beam pair links to use for communications with the base station, the indication of the one or more pairs of beam pair links comprising one or more quasi co-location properties for each of the pairs of beam pair links; and communicate, via the transceiver, with the base station via the one or more pairs of beam pair links.

30. An apparatus for wireless communication, comprising:

a processor of a base station, the processor coupled with a transceiver;

memory coupled with the processor, the memory and the processor configured to:

transmit, via the transceiver, to a user equipment (UE), a plurality of wideband reference signals each spanning a frequency range that comprises a plurality of subbands, wherein each of the plurality of wideband reference signals is transmitted concurrently with at least one other of the plurality of wideband reference signals; and receive, via the transceiver, from the UE and based at least in part on two or more of the plurality of wideband reference signals as concurrently transmitted, an indication of signal quality that is specific to a subband within the frequency range and indicates a group of two or more beam pair links of a set of beam pair links, wherein each beam pair link of the set of beam pair links comprises a transmit beam for the base station and a receive beam for the UE.

* * * * *